United States Patent
Jurisch et al.

(10) Patent No.: US 7,072,987 B2
(45) Date of Patent: Jul. 4, 2006

(54) METHOD FOR OPERATING AND OBSERVING FIELD DEVICES

(75) Inventors: Andreas Jurisch, Schwante (DE); Michael Schwenke, Hönow (DE); Stefan Walz, Berlin (DE)

(73) Assignee: Siemens Aktiengellschaft, Munich (DE)

( * ) Notice: Subject to any disclaimer, the term of this patent is extended or adjusted under 35 U.S.C. 154(b) by 105 days.

(21) Appl. No.: 10/492,630

(22) PCT Filed: Sep. 26, 2002

(86) PCT No.: PCT/DE02/03711

§ 371 (c)(1),
(2), (4) Date: Apr. 14, 2004

(87) PCT Pub. No.: WO00/77592

PCT Pub. Date: Dec. 21, 2000

(65) Prior Publication Data

US 2004/0255017 A1    Dec. 16, 2004

(30) Foreign Application Priority Data

Oct. 15, 2001 (DE) .................... 101 51 115

(51) Int. Cl.
*G06F 15/16* (2006.01)

(52) U.S. Cl. ............ 709/249; 709/203; 709/218; 709/219; 709/224; 709/250; 710/105; 702/188; 700/17; 700/19; 700/65; 700/83

(58) Field of Classification Search .......... 709/203, 709/208, 217–219, 223, 224, 249, 250; 700/2–4, 700/17, 9–11, 19, 20, 65, 83; 702/188; 710/105; 340/3.1, 3.9, 3.3, 3.31, 3.32, 3.71

See application file for complete search history.

(56) References Cited

U.S. PATENT DOCUMENTS

| | | | | |
|---|---|---|---|---|
| 5,732,219 A | * | 3/1998 | Blumer et al. | 709/227 |
| 6,209,048 B1 | | 3/2001 | Wolff | 710/62 |
| 6,298,377 B1 | * | 10/2001 | Hartikainen et al. | 709/223 |
| 6,738,388 B1 | * | 5/2004 | Stevenson et al. | 370/465 |
| 6,785,724 B1 | * | 8/2004 | Drainville et al. | 709/227 |
| 6,871,211 B1 | * | 3/2005 | Labounty et al. | 709/203 |
| 2001/0002900 A1 | | 6/2001 | Romrell | 370/216 |
| 2002/0049834 A1 | * | 4/2002 | Molnar | |
| 2003/0041135 A1 | * | 2/2003 | Keyes et al. | 709/223 |
| 2004/0128346 A1 | * | 7/2004 | Melamed et al. | |
| 2004/0260405 A1 | * | 12/2004 | Eddie et al. | |

FOREIGN PATENT DOCUMENTS

| | | |
|---|---|---|
| DE | 197 04 694 | 8/1997 |
| WO | WO 99/13388 | 3/1999 |
| WO | WO 00/77592 | 12/2000 |

* cited by examiner

*Primary Examiner*—Anthony Knight
*Assistant Examiner*—Crystal J Barnes
(74) *Attorney, Agent, or Firm*—Morrison & Foerster LLP

(57) ABSTRACT

The invention relates to a method for operating a proxy server device (1) connected to a field device (FG1–FGN), in addition to a proxy server device. The proxy server device can be connected to the field device and a user device (N1–NN) in order to respectively exchange electronic data in order to monitor and/or operate the field device. The electronic data consists of static data which is transmitted according to a first protocol standard and dynamic data which is transmitted according to a second protocol standard.

12 Claims, 15 Drawing Sheets

METHOD FOR OPERATING AND OBSERVING FIELD DEVICES

CLAIM FOR PRIORITY

This application claims priority to International Application No. PCT/DE02/03711, which was published in the German language on May 8, 2003, which claims the benefit of priority to German Application No. 101 51 115.9 which was filed in the German language on Oct. 15, 2001.

TECHNICAL FIELD OF THE INVENTION

The invention relates to the field of remote-controlled operation of field devices, and in particular for observing and operating field devices, for example in power plants.

BACKGROUND OF THE INVENTION

Field devices are used as part of the automation of various industrial processes, for example for monitoring a production or manufacturing process or a processing process. The field devices may be the production plants themselves or devices for monitoring, preferably for controlling and/or regulating on the basis of detected field data, the industrial production means or plants used.

When operating the field devices in use, it is fundamentally possible to distinguish between two kinds of operation. First, the field devices can be actuated in situ by actuating the control elements provided. In this case, the operator needs to be with the field device or to travel to the plant in question. Secondly, remote operation of field devices from monitoring and maintenance centers is part of the known prior art.

Standard terminal programs used for operating the field devices in this context provide the operator with only very little convenience and generally permit only simple control actions. Particularly information in graphically processed form, for example measurement data, cannot be displayed to the operator.

Complex control programs have therefore been developed for remotely operating the field devices. Such complex control programs need to be installed on the respective field device and thus take up memory areas which are no longer available for the device application. In addition, every operator needs the control program required for the respective field device. In the case of field devices from different manufacturers or field devices from the same manufacturer with different releases, a large number of programs or program versions can become necessary relatively quickly.

Within the context of the remote operation and observation, it is firstly necessary to transfer data which need to be provided only once between the field devices and the apparatuses used by the operator. In addition, the field devices need to transfer electronic data to the apparatuses used by the operator which are no longer current after a short time and therefore need to be continually updated. These are, in particular, the measurement data detected in the field devices which need to be transmitted to the user apparatuses for evaluation and/or output.

In known control systems, the functions available to the operator are limited. Thus, in a network comprising a plurality of field devices and a plurality of apparatuses used by various operators for remote operation and observation, it is quite possible for a plurality of operators at one time to be using their control apparatuses to access just one and the same field device (cf. "Mini-Sternkoppler" [ministar coupler], Siemens AG, Order No. G34924-K2106-U1-A2, for example). It is an object of the invention to provide an improved way of operating and observing when remotely operating field devices, which is able to be used flexibly for various types of field device.

SUMMARY OF THE INVENTION

One embodiment of the invention relates to the provision of a proxy server facility between field devices and user devices. This allows a plurality of users at one time to use a respective user facility, particularly a personal computer, to access different field devices for the purpose of operation and/or observation. This improves operating convenience and extends the application options for operating and observation systems, since it is possible to access various field devices simultaneously.

In another embodiment of the invention, providing the proxy server facility makes it possible to split the data which are to be interchanged between the field devices and the user facility (facilities) into dynamic and static data which can be transferred using the proxy facility on the basis of respectively suitable protocols. Providing a proxy server facility between the field devices and a field device or a network comprising a plurality of field devices and their operators in line with the novel method makes it possible to reduce the time and technical involvement for transferring the electronic data, which means that electronic line capacities can be used in an improved manner.

In one aspect of the invention, the first protocol standard is the HTTP protocol, as a result of which it is possible to use a standard protocol, which is widespread in connection with data transfer.

In one advantageous embodiment of the invention, the second protocol standard is used in order to use a connectionless protocol. Connectionless protocols allow resource-saving, rapid data interchange with the field device. In this context, it is necessary for the application on the field device to undertake connection protection for the connectionless protocol.

In one preferred embodiment of the invention, provision can be made for the static data to be transferred from the field device to the proxy server facility, and to be stored in a memory facility in the proxy server facility, when they are first called by the user facility, which means that the static data are available in the proxy server facility for fresh retrieval by the user facility. This avoids repeated retrieval of the static data from the field devices, which means that line capacity is saved and can be used for other data transfers.

To ensure that data which vary over time and are output in the user facility for the operator are up-to-date, one expedient development of the invention provides for the dynamic data to be transferred from the field device to the proxy server facility and from the proxy server facility to the user facility whenever they are called by the user facility.

The method can advantageously be used for monitoring/operating power plants, which are frequently arranged at scattered locations.

The method and/or the apparatus can advantageously be used for monitoring power plants.

BRIEF DESCRIPTION OF THE DRAWINGS

The invention is explained in detail below using exemplary embodiments with reference to a drawings, in which.

DETAILED DESCRIPTION OF THE INVENTION

The text below describes an "observation and operating system" (O&O system) which can be used in connection with field devices.

Figure 1:
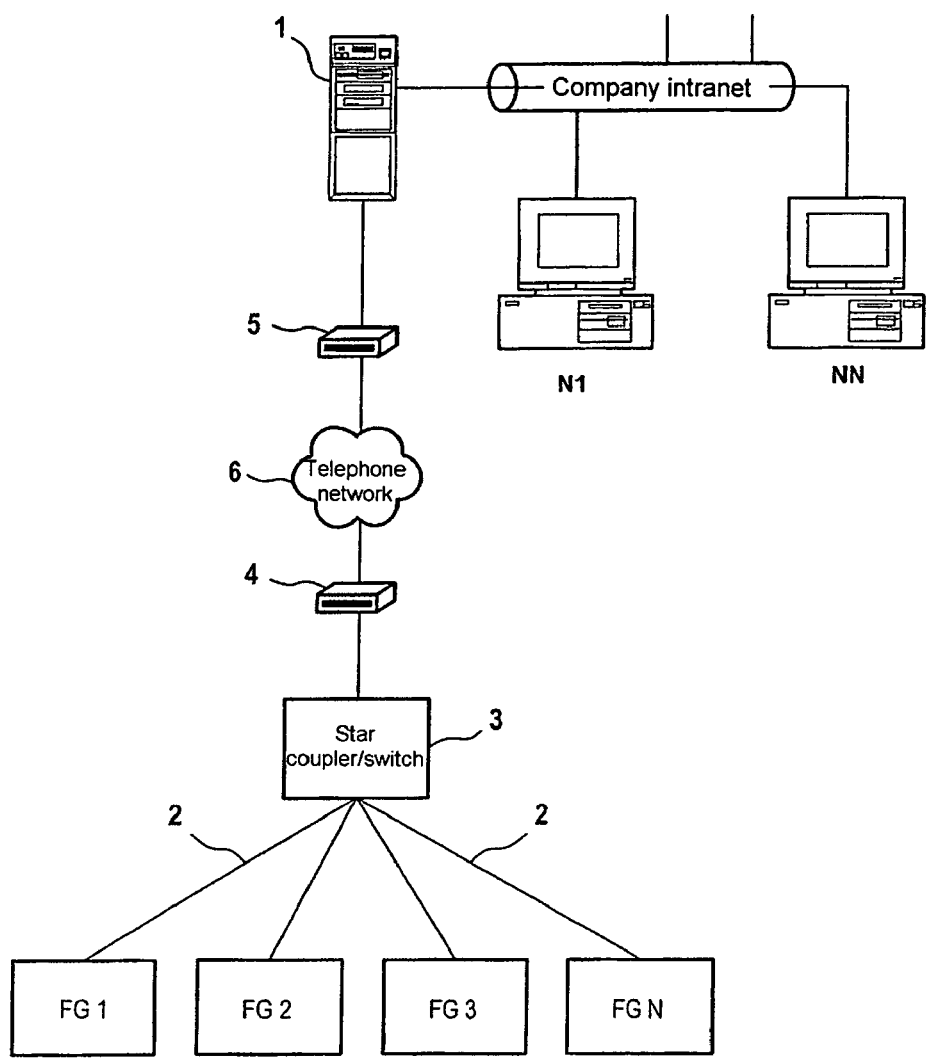
FIG. 1 shows a device network and a company intranet which are connected by a proxy server.

FIG. 1 shows a schematic architecture for two networks, a device network having a plurality of field devices FG1 ... FGN and a company intranet having a plurality of user facilities N1 ... NN, preferably personal computers (PC). The device network and the company intranet are connected by means of a proxy server 1. The proxy server 1 is part of the observation and operating system and serves as a gateway between the device network and the company intranet. The O&O system is used firstly to detect information, for example measurement and/or state data, from the field devices FG1 ... FGN and to transmit it to the user facilities N1 ... NN, in order to inform a user of the user facilities N1 ... NN about the operating state of the field devices FG1 ... FGN. Secondly, the O&O system is used to detect operating or control inputs from the user with the aid of the user facilities N1 ... NN and to implement the inputs from the user in the field devices FG1 ... FGN. The field devices FG1 ... FGN can be any devices for observing, measuring, controlling and/or regulating a wide variety of physical variables in different industrial processes, for example for monitoring and/or controlling power plants, for example in a transformer substation.

Figure 2:
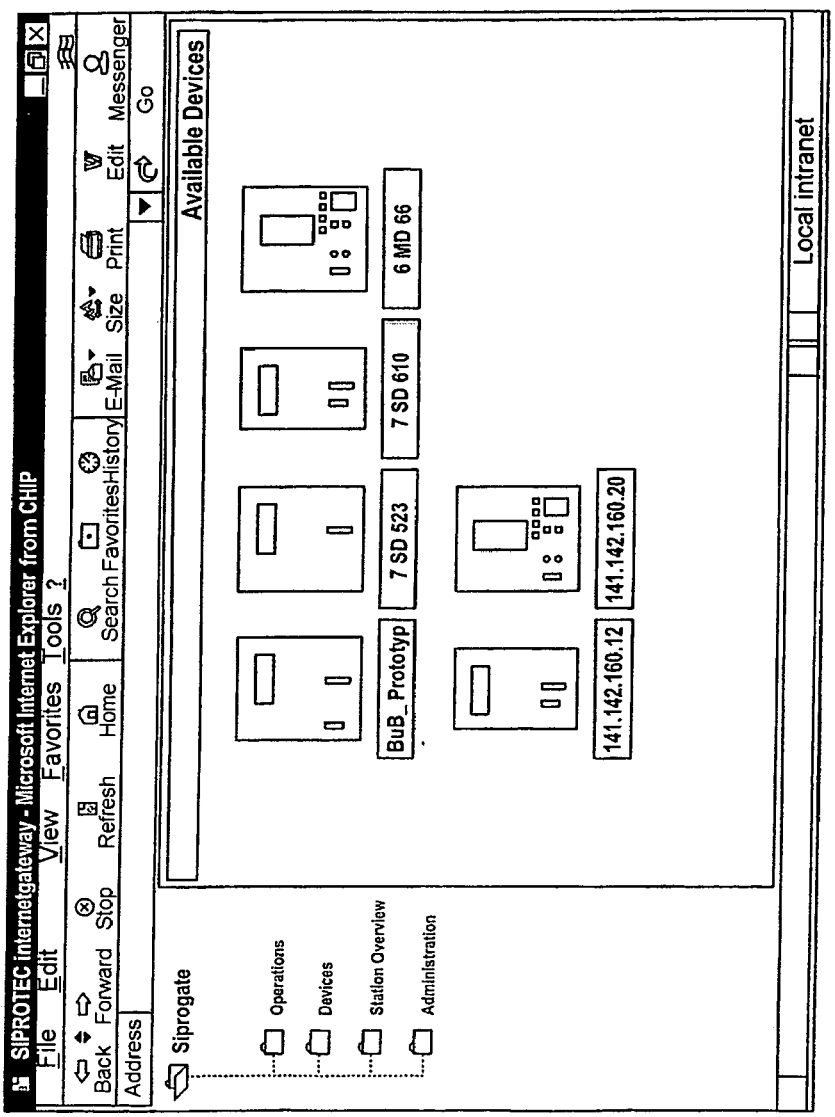
FIG. 2 shows an interface design for a browser facility for graphical representations of a plurality of field devices.

The device network comprises individual PPP connections 2 (PPP—"Point to Point Protocol"), which can be connected to the proxy server 1 by means of a star coupler 3, or a separate Ethernet segment. The proxy server 1 provides a dedicated homepage in the form of HTML data (HTML—"Hypertext Markup Language"), which shows an overview of the field devices FG1 ... FGN which can be reached in the device network (cf. FIG. 2); the homepage can be displayed in the user facilities N1 ... NN using a standard browser.

In line with FIG. 1, the field devices FG1 ... FGN are equipped with the star coupler 3 and a modem 4 connected thereto. In this case, the field devices FG1 ... FGN are connected to the modem 4 directly by means of the star coupler 3 via an asynchronous serial interface. Various forms of coupling using active and passive star couplers are possible. The protocol used for accessing the field devices FG1 ... FGN is an IP protocol (IP—"Internet Protocol") via a PPP link layer.

If the field devices FG1 ... FGN are equipped with an Ethernet access point, the Ethernet access points are connected to a switch or a hub. If this switch or this hub also has a PPP port besides Ethernet ports, then it is referred to as a router. This PPP port can then likewise be connected directly to the modem 4.

In the company intranet, the user facilities N1 ... NN connected to the local area network have access to a modem 5 which can be connected to the device network's modem 4 via a telecommunication network 6, for example a telephone network based on an ISDN network or a mobile radio network. If a respective data communication connection is set up in the user facilities N1 ... NN, then the field devices FG1 ... FGN can be respectively accessed from the user facilities N1 ... NN. If the proxy server 1 is now addressed by the user facilities N1 ... NN, each of the user facilities N1 ... NN connected to the company intranet can access the field devices FG1 ... FGN for observation and operation. The proxy server 1 "mirrors" all the field devices FG1 ... FGN, i.e. information about the field devices FG1 ... FGN, into the company intranet. To this end, the proxy server 1 processes the following protocols: HTTP protocol (HTTP—"Hypertext Transfer Protocol") and RPC protocol (RPC—"Remote Procedure Call"). The HTTP protocol is used for transferring static data. These are data which are transferred just once to the proxy server 1 and are then stored in a file store there for later retrieval by the user facilities N1 ... NN. The RPC protocol, which is likewise an IP-based protocol, is used for transferring dynamic data. The dynamic data are, in particular, measurements detected in the field devices FG1 ... FGN and/or event lists, relating to information about events in the field devices FG1 ... FGN.

The HTTP protocol allows the user facilities N1 ... NN to access the field devices FG1 ... FGN. Access within the context of the O&O system first involves selecting the associated IP address of the field device which is to be operated/observed in order to transmit HTML data from the field device to the user facility used in this instance of application, the HTML data comprising data which can be used to generate a representation of the field device in the browser facility of the retrieving user facility, as shown by way of example in FIG. 3. Retrieval of the HTML data for generating the representation shown in FIG. 3 can be triggered by the user selecting one of the field devices shown in the overview in FIG. 2, for example by actuating a mouse or a keyboard on the user facility.

Figure 3:
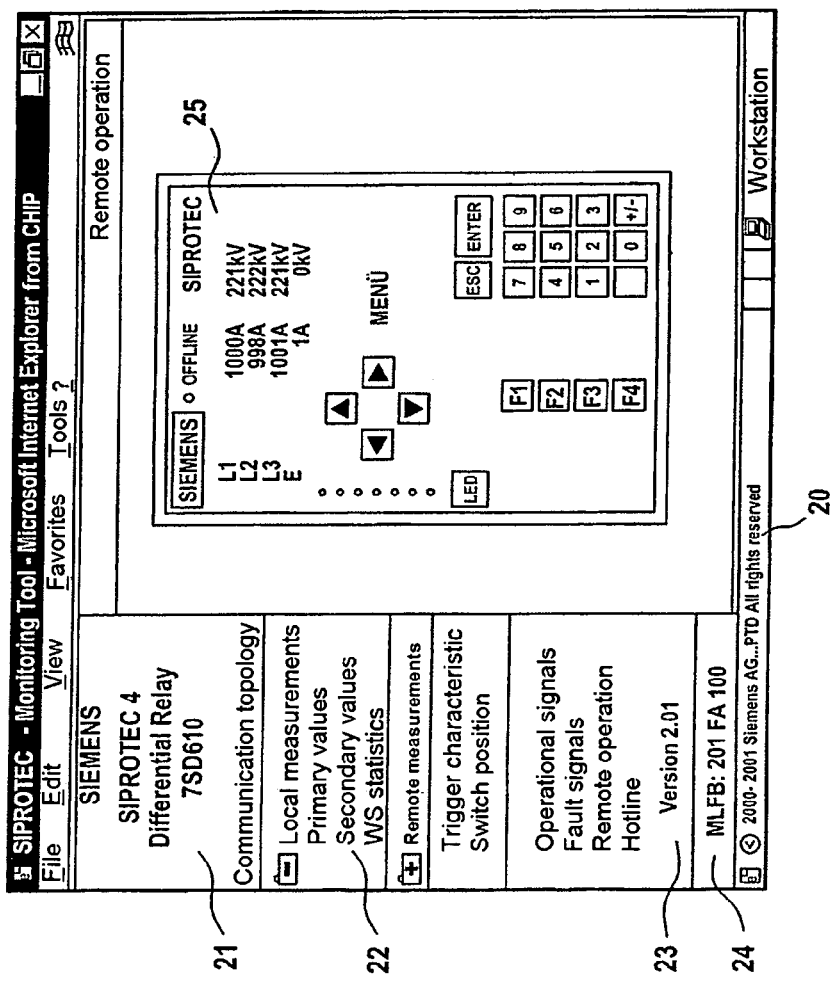
FIG. 3 shows another interface design for the browser facility with a graphical representation of a front view of a field device.

In line with FIG. 3, the following information is shown on the interface 20 of the browser facility (cf. left-hand side in FIG. 3): field device family (e.g. SIPROTEC4), field device class and field device type 21, a control tree 22, the version of the O&O tool 23 (version and date) and details relating to the connection 24 to the field device (MLFB—"machine-readable factory designation", BF number, connection status and IP address). The interface also displays the HTML page 25 associated with a link or branch in the control tree 22.

Depending on the link selected in the control tree 22, the associated HTML page 25 is displayed on the browser facility's interface 20.

The HTML pages stored in the field devices FG1 . . . FGN, i.e. including the HTML page 25 used to generate the representation shown in FIG. 3, can comprise Java code which prompts the browser facility in the respective user facility N1 . . . NN to set up a further connection to the field devices FG1 . . . FGN, in parallel with the existing HTTP connection, in order to display the HTML page loaded from the field devices FG1 . . . FGN. This second connection uses the RPC protocol to transfer dynamic data, such as event lists or measurements, from the field devices FG1 . . . FGN particularly quickly and effectively for representation in the user facilities N1 . . . NN within a selected HTML page, for example the HTML page 25 shown in FIG. 3.

Retrieval of Information from the Field Devices

Figure 4:
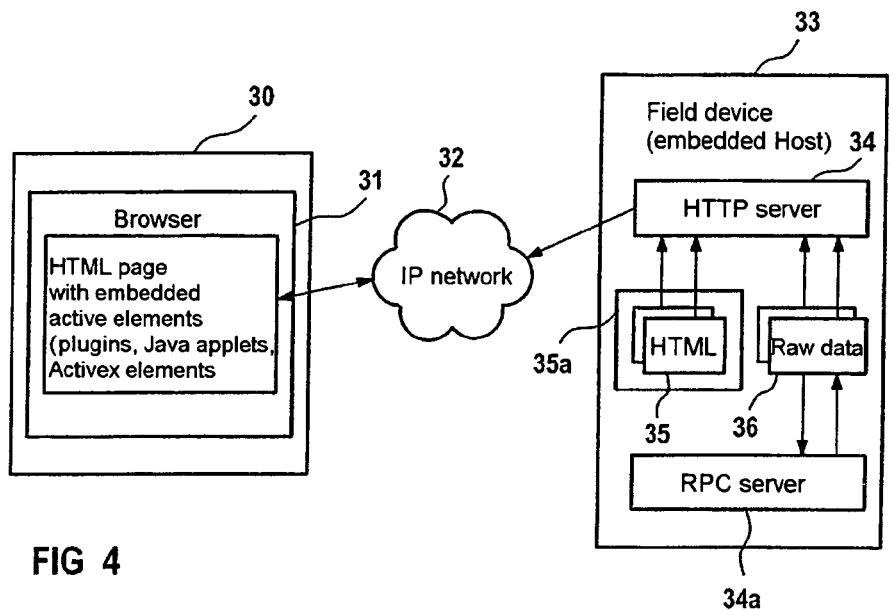
FIG. 4 shows an on the field device and of a user personal computer.

FIG. 4 shows a schematic illustration to explain in more detail the retrieval of information within the context of the O&O system from the field devices FG1 . . . FGN to the user facilities N1 . . . NN.

Figure 5:
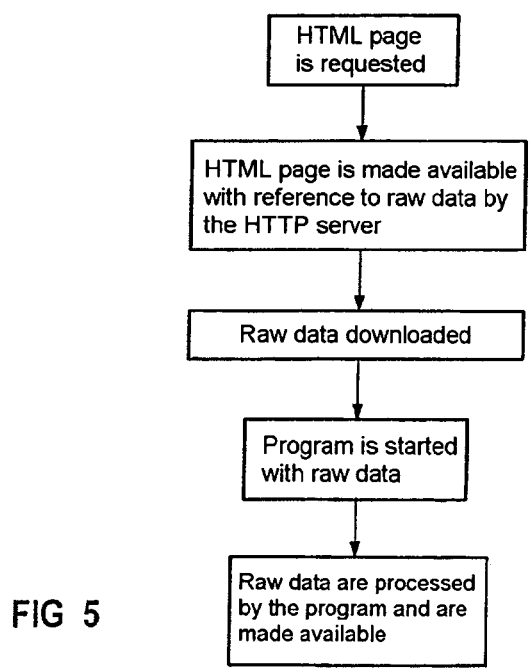
FIG. 5 shows a flowchart for downloading HTML pages within the context of an observation and operating system.

In line with FIG. 4, a browser facility 31 is installed on a user personal computer 30, which is an exemplary form of the user facilities N1 . . . NN. The user personal computer 30 is connected to a field device 33 via an IP network 32, which can comprise the proxy server 1, the star coupler 3, the modem 4, the modem 5 and the telecommunication network 6. The field device 33 has an HTTP server 34. The field device 33 stores HTML pages 35 which comprise information specific to this field device 33. By way of example, the HTML pages 35 contain an HTML representation of the front view of the field device 33. The HTML pages 35 are specifically in tune with the field device 33 and can be retrieved from the HTTP server 34 in the field device 33 by the user personal computer 30 by means of an HTTP download. The requesting of the HTML pages 35 from the field device 33 can be triggered by means of the input of an URL (URL—"Uniform Resource Locator") in the browser facility 31 or by using the reference from another HTML page ("link"). Besides the HTML pages 35, the field device 33 provides a series of raw data 36 (measurements, parameters etc.) in the form of files. The HTML pages 35 contain references to the raw data 36 available in the field device 33. If the raw data 36 are to be evaluated or changed in another way, a program is needed which can produce high-quality data formats on the basis of particular algorithms. These data formats can then be used by the program for screen display in connection with analysis options, for example. The computation power required for this is generally not available in the field device 33. The browser facility 31 can be used to give the user the option of using the IP network 32 to access the HTML pages 35 from the field device 33 and hence also the raw data 36, referenced therein, from the field device 33 via communication connections (modem, telephone networks, LAN—"Local Area Network", WAN—"Wide Area Network"). In line with FIG. 5, this is done by using the browser facility 31 to request the HTML page(s) 35 from the user personal computer 30 first of all. After the HTTP server 34 in the field device 33 has provided the HTML page(s) 35, including the references contained therein to the raw data 36, the HTML page 35 and the raw data 36 are transferred to the user personal computer 30. In this context, the HTML page 35 and the raw data 36 are transferred between the field device 33 and the user personal computer 30 using separate protocols, preferably the HTTP and RPC protocols. The user personal computer can then process the raw data 36 using suitable programs. To execute the RPC protocol, the field device 33 additionally comprises an RPC server 34*a*.

When the HTML page 35 is downloaded from the HTTP server 34, the referenced files containing the raw data 36 can automatically be loaded as well. The call from the HTML page 35 can have the following appearance: <EMBED SRC="rawdata.ext">. The parameter "SRC" references the file including the raw data 36 from the field device 33. In addition, downloading of the raw data 36 can also be triggered using a link to the HTML page 35, which link needs to be activated by the user. For this case, the call in the HTML page 35 could have the following appearance: <a href="rawdata.ext" type="mime type">link</a>.

So that the browser facility 31 is able to start the correct program for processing the raw data 36 further, the browser facility 31 needs to be notified of the content type of the raw data 36. There are different procedures depending on the operating system used on the user personal computer 30, and depending on the browser facility 31 used. It is possible to evaluate both the file extension (for example "*.ext") and the MIME type (MIME—"Multipurpose Internet Mail Extension") simultaneously delivered by the HTTP server 34. The raw data processing program started by the browser facility 31 undertakes the conversion of the downloaded raw data 36. The raw data processing program can be in the form of a browser plugin, in the form of an activeX component or in the form of an external program.

In this context, it is necessary to distinguish between various types of raw data. Sporadically arising raw data 36 are preferably processed using a browser plugin or an ActiveX component. In this connection, the data are accessed using the TCP protocol. If the aim is to process constantly updated raw data 36 in the form of a continuous datastream, then it makes sense to use a more effective protocol for the transfer to the user personal computer 30 (the user facilities N1 . . . NN). Use of the additional RPC protocol allows the information about the field device(s) FG1 . . . FGN or 33 which is to be represented in the user facilities N1 . . . NN (or the user personal computer 30) to be split into static and dynamic information. The static information is transferred using the HTTP standard protocol, while the dynamic, that is to say variable, data are transferred using the more effective RPC protocol. The complexity which would arise as a result of connection setup/cleardown and connection monitoring if the dynamic data were sent using the HTTP protocol would exceed that of the event-dependent, repeated sending of the dynamic data using the RPC protocol. Since generally only a small volume of data needs to be transmitted quickly (measurements, signal lists, . . . ), the use of a connectionless protocol, particularly of the RPC protocol, for the dynamic data is advantageous. In the case of a remote procedure call (RPC), a local program calls a procedure on a remote system. The concept of the remote procedure call ensures that the network code remains hidden in the RPC interface and in the network routines. This avoids the need for the application programs (client and server) to concern themselves with details, such as EBCDIC < - - - > ASCII conversion, numerical conversion, socket, session etc. One aim of RPC is to simplify the implementation of distributed applications. UDP (UDP—"User Defined Protocol") is used by a few applications which send only short messages and are able to repeat these. UDP is therefore an ideal protocol for distributing information which is constantly changing, such as stock market prices. Instead of packing the data into a TCP envelope and then into the IP envelope, they now migrate into a UDP envelope before entering the IP envelope.

Although UDP is domiciled in the same layer as the connection-oriented TCP, it is a connectionless protocol. The use of the UDP protocol appears appropriate whenever just a small volume of data needs to be transmitted quickly. Hence, application programs between client and server involve an exchange of short queries and responses. In this case, the complexity which arises as a result of connection setup/cleardown and connection monitoring would exceed that of resending the data. The separate transfer of static and dynamic data between the field devices FG1 . . . FGN in the device network and the user facilities N1 . . . NN in the company intranet using different protocols is optimized by virtue of the provision and specific form of the proxy server 1, which will be described in detail later.

Figure 6:
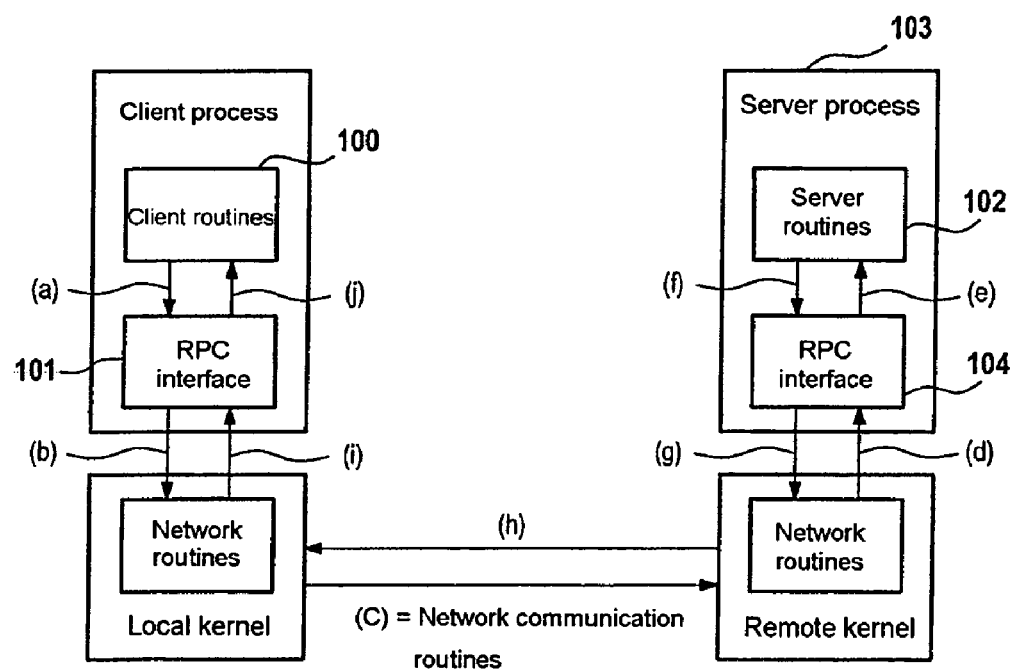
FIG. 6 shows a block diagram to explain an RPC call.

The text below describes the use of the RPC protocol for retrieving the dynamic data in a client/server arrangement (user facilities N1 . . . NN/field devices FG1 . . . FGN) with reference to the schematic illustration in FIG. 6.

An RPC call proceeds in the following exemplary manner:

(a) A client process 100 running within the browser 31 (cf. FIG. 4) calls an RPC interface 101. This client process 100 may be, by way of example, a Java applet embedded in an HTML page. The task of the RPC interface 101 is to specify the subprogram entry. The specification contains the name of the function and also the number and types of the parameters. This defines a logical entry. The RPC interface 101 allows the remotely situated procedure 102 to be started.

(b) The parameters of the client process 100 are read by the RPC interface 101. The purpose of the RPC interface 101 is to package and convert the parameters for the server program.

(c) The network routines send the messages to a server process 103 running in the RPC server 34a.

(d) An RPC interface 104 for the server process 103 reconstructs the parameters from the message packets.

(e) Then, the server program is called. This is done by defining a server stub. This stub is the actual entry into the procedure which is on the server process 103.

(f) When the procedure has been executed, control is passed to the RPC interface 104 again.

(g) The interface 104 packages the return parameters and then transports the data to the network routines.

(h) The network routines transport the data about network-dependent calls to the client process 101.

(i) The RPC interface 101 for the client process 100 unpacks the parameters and supplies the specified parameters with the new data.

(j) Control is returned to the client process 100, which is able to process the received data further.

The concept of the remote procedure call ensures that the network code remains hidden in the RPC interface and in the network routines. This avoids the need for the application programs (client and server) to concern themselves with details, such as EBCDIC < - - - > ASCII conversion, numerical conversion, socket, session etc. One advantage of using the RPC protocol for the dynamic data is simplification of the implementation of distributed applications.

Operating the Field Devices

The retrieval of information from the field device 33, which comprises the HTTP server 34, described in connection with FIG. 4 can also be used in connection with actions within the context of the observation and operating system which are performed for the purpose of operating the field device 33. This allows the field device 33 to be operated using the browser facility 31. This is described in more detail below.

The field device 33 contains a memory facility 35a, storing control software in the form of HTML pages 35, and a Java archive or data from which HTML pages can be generated. The control software is tailored specifically to the field device 33. Input of the URL address of the field device 33 by the user starts an HTTP download, which downloads the control software from the HTTP server 34 in the field device 33 to the user personal computer 30. When the control software has been downloaded from the field device 33 to the user personal computer 30 in the form of the HTML page(s) 35, the front view of the field device 33 with all the control and display elements is shown within the browser facility (cf. FIG. 3). The user can then trigger particular control functions in the field device 33 using a mouse click on the screen of the user personal computer 30. The user action is transmitted to the field device 33 by means of a fast and effective protocol which firstly transfers said control requests from the user personal computer 30 to the field device 33 and secondly reads back reactions from the field device 33. For this purpose, the internal control and display functions of the field device 33 are published for the interface of the browser facility 31, e.g. keyboard buffer, display buffer, LED status.

Operation by the user involves an exchange of short queries and responses between the user personal computer 30 and the field device 33 within the context of a client-server relationship. In this context, the complexity arising in connection with the setup/cleardown and monitoring of the HTTP connection between the user personal computer 30 and the field device 33 would exceed the complexity arising in the event of the data being sent and received again in line with a connectionless protocol. Since generally only a small volume of data needs to be transmitted quickly (e.g. keystroke, display content, LED status), the use of a fast, effective, connectionless protocol makes sense, for example the RPC protocol described above. Methods for compressing data are used to reduce the volume of data interchanged (e.g. display content) between the user personal computer 30 and the field device 33.

Internet protocols, such as TCP/IP and HTTP, provide no kind of security mechanisms. Additional protocols are required in order to allow secure communication. The mechanisms for protecting security-related actions on the field device 33 using TCP/IP communication are of particular importance. The control actions on the field device 33 can be classified in terms of protecting against unauthorized access operations (cf. table 1).

TABLE 1

| Action | Security risk | Measures |
| --- | --- | --- |
| Read measurements; | Low—if the RPC data traffic is concomitantly read, | An internal UDP protocol (UDP - |
| Read signal lists | Information relating to operational management (operational measurements, signals, faults) may be viewed to the extent of the data displayed on the HTML pages | "User Defined Protocol") is used. Since this protocol is known only to the manufacturer, reengineering is necessary in order to decrypt the contents |

TABLE 1-continued

| Action | Security risk | Measures |
|---|---|---|
| Reparameterize device | High—these actions are password protected on the device | Optional encryption of the very short protocols (complex) |
| Switch, control, erase buffers | Very high—the protocols may be recorded and subsequently repeated | 128-bit encryption of password protected actions |

Abusive actions when operating the field device 33 can be substantially prevented by means of the following measures:

- a firewall (e.g. proxy server) allows the internal network (company intranet/LAN) to set up a protected connection to another network (e.g. Internet).
- When delivered, the field device 33 is set such that keys allowing full input of customer passwords are disabled. This disablement needs to be cancelled by the customer on the field device 33 itself or using the control program in the browser facility 31 on the user personal computer 30 (input of password required). Upon delivery, therefore, only simple control actions using the browser facility 31 are possible: navigation in the control menu, display of measurements, parameters and signal lists.
- Parameterization of the field device 33 in the front view emulation is possible with knowledge of the passwords as on the field device 33 if the disablement of the keys required to do so has been cancelled.
- Security-related actions on the field device 33 (switching, controlling, erasing buffers, . . . ) are protected by authentication protocols, e.g. using a hash function and a key generated by the field device 33. This means that the connection protocol cannot be used to infer passwords which have been input. This method is used to take a message of arbitrary length and form a 128-bit information item, the "message digest", which will be attached to the original message. The receiver (field device 33) compares the "message digest" with the one ascertained by the field device 33 from the information item. This means that field device passwords are not transferred via the communication connection.
- The keys generated in the field device 33 expire after a short time and can be used for a transfer only once. Hence, recording security-related protocols and subsequently repeating these recorded protocols have no effect.

Proxy Server

An element for optimized implementation of the described functional interaction between the elements of the observation and operating system, for example the use of the RPC protocol, the retrieval of the raw data from the field devices FG1 . . . FGN and the operation of the field devices using browsers on the user facilities N1 . . . NN, is the proxy server 1. Known standard HTTP proxy servers support the HTTP protocol exclusively and are thus not able to serve as a gateway between the device network and the company intranet. For this reason, a specific proxy server 1 designed for the O&O system has been created which supports both of the protocols (HTTP, RPC) used by the field devices FG1 . . . FGN.

A significant advantage which exists when the proxy server 1 is used, as compared with the device network being coupled to the company intranet by means of routers or, if there is no WAN connection (WAN—"Wide Area Network") between the device network and the intranet, the device network segment being coupled directly using a hub or a switch, is the use of "caching".

The principle underlying this method ("caching") is described briefly below on a general basis, without reference to the aforementioned figures.

If a client sends a query regarding an object to a server facility, this query is first routed via a "proxy facility". The proxy facility checks whether the object in question is already present in a local memory (cache) in the proxy facility, which is generally formed on a hard disk. If this establishes that the object is not available locally in the memory, the proxy facility forwards the query to an actual destination server facility. From there, the proxy facility obtains the object and stores a copy of the object for further queries regarding this object in a local memory before the proxy facility forwards the object to the querying client. If the object is found in the proxy facility's local memory, however, then the client's query is not sent to the destination server facility, but rather the client receives the desired object transmitted directly from the proxy facility. A prerequisite for optimum performance of the method described is a sufficiently large memory area in the proxy facility, i.e. of the order of magnitude of between several hundred MB and several GBytes. Otherwise, the local memory in the proxy facility overflows and a "garbage collector" needs to be started, which filters outdated objects from the memory in order to create space for new objects there.

Advantages of the method described ("caching") are as follows: an improvement in performance (faster data transport than externally); a saving in terms of external bandwidth (more space for other services remains free); a reduction in the response times; removal of load from the destination server facility; transporting the object from the proxy facility to the client incurs no or smaller transfer costs; and the number of hits in the proxy facility's local memory may be very high, depending on use.

The proxy server 1 used to connect the device network and the company intranet (cf. FIG. 1) is based on the basic principle described and, furthermore, has the advantages cited below, on account of the specific form, which is described in detail later on.

The use of the proxy server 1 (cf. FIG. 1) affords significant speed advantages for accessing the device network. The proxy server 1 comprises a file store or file cache which is optimized for application in the O&O system and buffers files retrieved from the field devices FG1 . . . FGN with static data in the proxy server 1. If such a file is being accessed for the first time, then this file needs to be fetched directly from one of the field devices FG1 . . . FGN. When access to this file is repeated, the file can then be delivered directly from the file cache in the proxy server 1, however. Since the local company intranet is generally much faster than a modem connection to the field devices FG1 . . . FGN, this results in significant speed advantages for accessing the device network, since ongoing operation now involves only the dynamic data, which are much smaller in volume than the HTML pages and the Java archives, being transferred via the slow modem connection.

In addition, the proxy server 1 increases the security in the network. The proxy server 1 separates the two networks, device network and company intranet, from one another and transfers only the protocols which are processed in the proxy server 1. This means that the requests generated for the field devices FG1 . . . FGN by a browser on the user facilities N1 . . . NN are transferred from the company intranet. In the opposite direction, only the responses generated by the field devices FG1 . . . FGN are transferred. This means that other data packets circulating in the company intranet are kept away from the device network and thus do not influence the throughput in the device network. In addition, a high volume of data arising in the device network cannot increase the network load in the company intranet as a result of cross communication between the field devices FG1 . . . FGN.

Use of the RPC protocol by means of the proxy server 1 has the advantage of ensuring that the opportunity for accessing the field devices FG1 . . . FGN remains limited to the company intranet connected to the proxy server 1. A company intranet is today usually connected to the Internet via an HTTP gateway. In this case, this gateway undertakes a firewall function (cf. FIG. 7) by blocking transfer of the RPC protocol. This means that it is no longer possible to access the data in the field devices FG1 . . . FGN outside of the company intranet, since the dynamic data in the field devices FG1 . . . FGN are transferred using the RPC protocol.

The proxy server 1 allows many different functions which are not available in the case of the previously customary, direct access to the field devices FG1 . . . FGN. The following catalogue lists further essential functions which are obtained in connection with the subsequent, detailed description of the proxy server 1:

- A dedicated homepage is provided which can be used to reach all the connected field devices FG1 . . . FGN.
- The connected field devices FG1 . . . FGN are automatically addressed and identified; these field devices FG1 . . . FGN are represented in the homepage as starting page on the user facilities N1 . . . NN for direct device access.
- Access using device names for the field devices FG1 . . . FGN is made possible, and this is more user-friendly than access using the IP address.
- The proxy server 1 can be configured using browsers on the user facilities N1 . . . NN (e-mail addresses, telephone numbers, device names, . . . ).
- The proxy server 1 defines the possible access parts ("firewall function").
- The proxy server 1 can buffer-store data from the field devices FG1 . . . FGN. This function is suitable, by way of example, for logging the fault information or the operational measurements. These data are stored internally in an XML database (XML—"Extended Markup Language").
- The proxy server can provide the data transferred from the field devices FG1 . . . FGN using the RPC protocol in XML format. This allows, by way of example, user-specific extensions of the representations available in the proxy server 1 to be made. To this end, an XSL parser (XSL—"Extended Stylesheet Language") integrated in the proxy server 1 is available.
- The filters for the XML database, which are able to be implemented using the XSL parser, allow the proxy server 1 to be used likewise as a client for further applications.
- Signaling of events in the LAN (LAN ="Local Area Network") via e-mail is possible. The proxy server 1 provides dedicated e-mail mailboxes which can be retrieved using a POP3 client (POP3—"Post Office Protocol Stepping 3"), such as Outlook. In addition, it is possible for e-mails to be forwarded to another mailbox using an STMP server (SMTP—"Simple Message Transfer Protocol") integrated in the proxy server 1.

The form of the proxy server 1 is described in more detail below.

Figure 7:
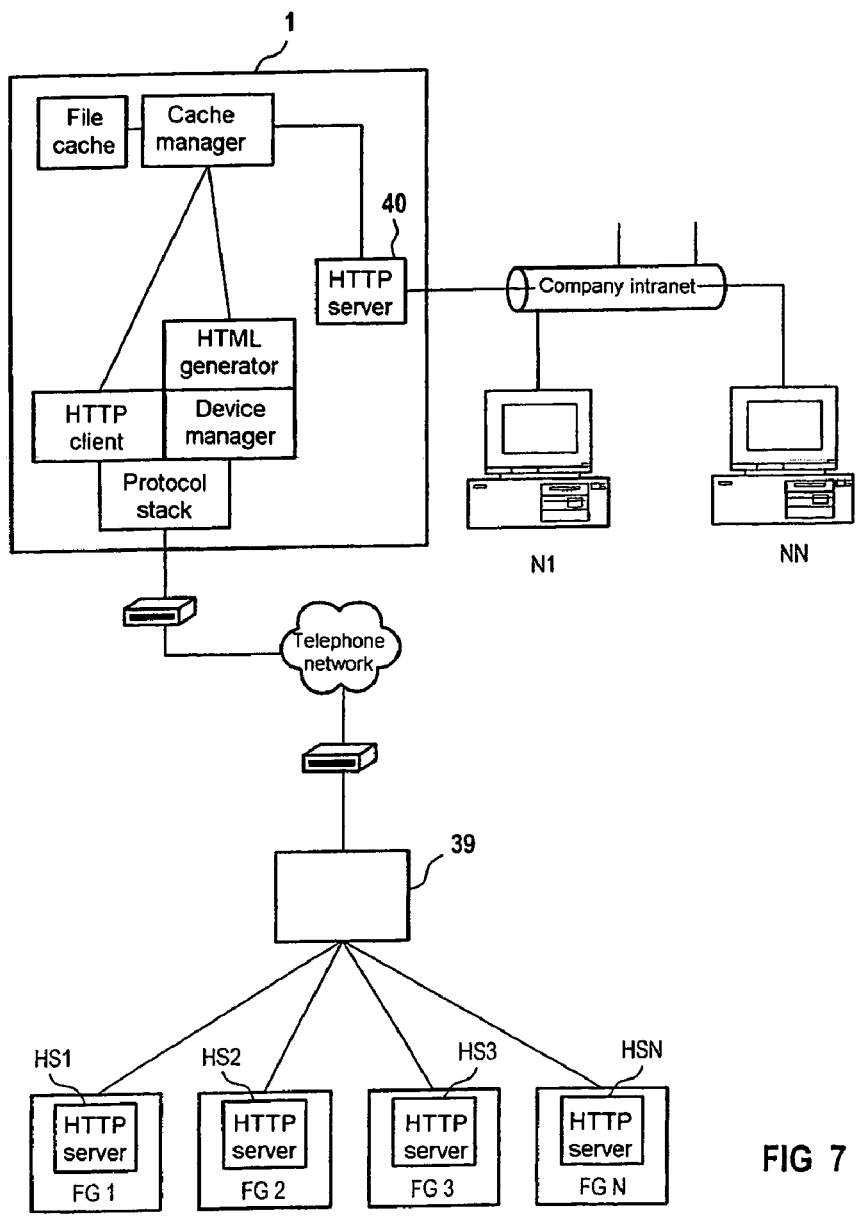
FIG. 7 shows the device network and the company intranet shown in FIG. 1, where individual elements of the proxy server are shown schematically.
Figure 8:
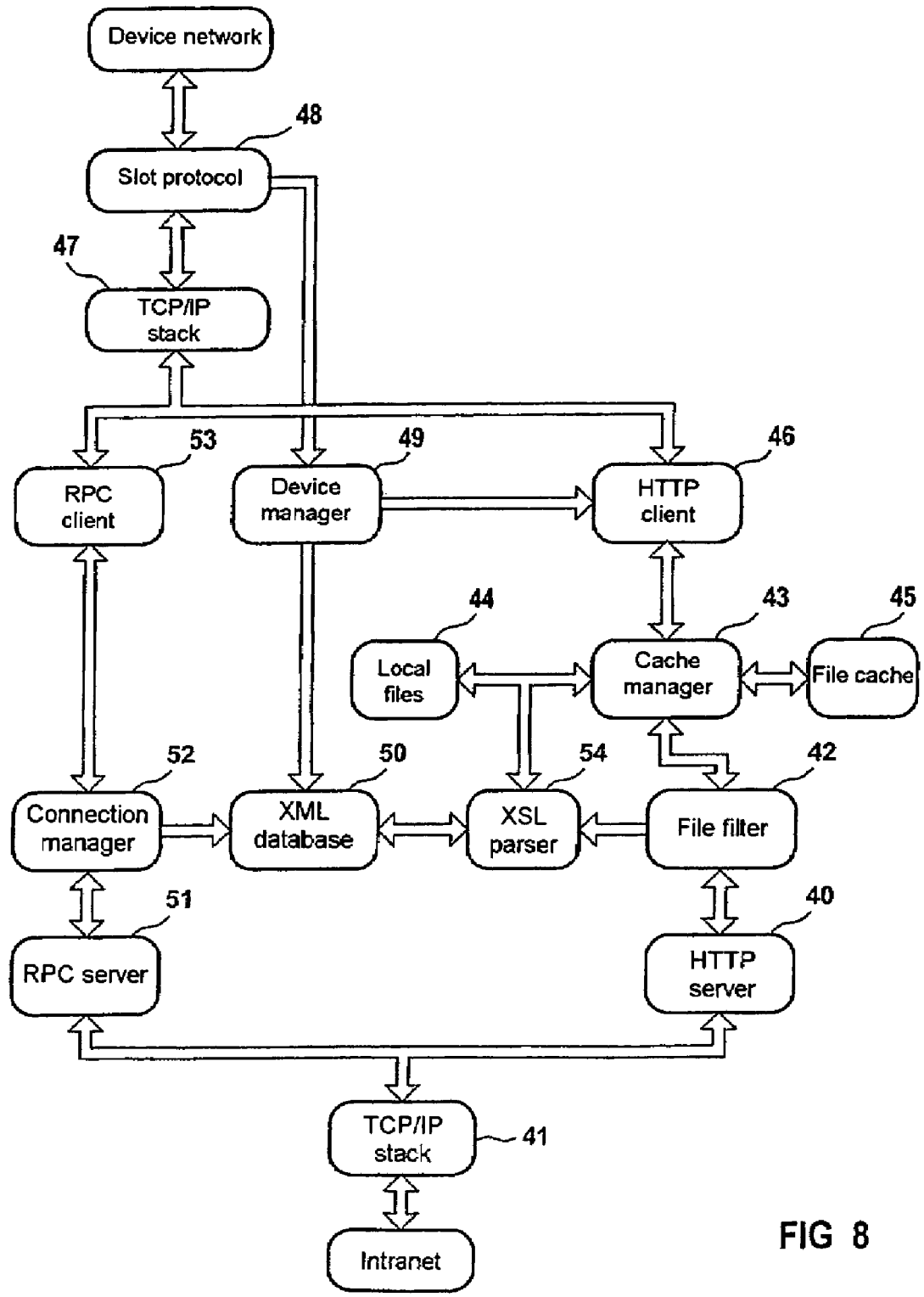
FIG. 8 shows a schematic block diagram of the proxy server.

FIG. 7 shows an arrangement with the device network and the company intranet shown in FIG. 1, where elements of the proxy server 1 are shown schematically. FIG. 8 shows function blocks of the proxy server 1 in a block diagram.

In line with FIG. 7, each of the field devices FG1 . . . FGN has a respective HTTP server HS1 . . . HSN which correspond to the respective HTTP server 34 (cf. FIG. 4) and are connected to a star coupler 39. The proxy server 1 likewise has an HTTP server 40. The text below describes the way in which the proxy server 1 works, with reference to FIG. 8.

The proxy server 1 is accessed from the local network of the company intranet, which includes the user facilities N1 . . . NN with the respective modem connection to the device network, comprising the field devices, which may comprise a transformer substation or a plurality of substations. If one of the user facilities N1 . . . NN is addressed as a server using the associated local IP address, this access is forwarded via a TCP/IP stack 41 (TCP—"Transfer Control Protocol") to the HTTP server 40.

The HTTP server 40 delivers the requested files to the company intranet. For this purpose, the HTTP server 40 addresses a cache manager 43 via a file filter 42. The file filter 42 normally forwards the request to the cache manager 43. Only particular requests are identified on the basis of the requested file type and supplied to a different processing path. These exceptions are described later on. The cache manager 43 at first attempts to find the requested file in the local files 44 or in a file cache 45. If the requested file is neither a local file on the proxy server 1 nor present in the file cache 45, the file request is forwarded to an HTTP client 46. This uses a further TCP/IP stack 47 to set up a connection to the HTTP server HS1, . . . or HSN in the addressed field device FG1, . . . or FGN in the device network in order to obtain the requested file from there.

As connection to the device network, a modem connection using the PPP protocol is preferably used (cf. FIG. 1). However, since the proxy server 1 can use this modem connection to maintain a plurality of connections to various field devices FG1 . . . FGN at the same time, arbitration is required for this modem connection, since the PPP protocol can manage only a point-to-point connection. To this end, a block slot protocol 48 is used. This protocol assigns the individual PPP connections time slices on the modem communication path and thus prevents collisions between the individual connections. The block slot protocol 48 is also responsible for identifying all the field devices FG1 . . . FGN which are active in the device network. To this end, the device network is cyclically searched for active field devices. The identified active field devices are entered into an XML database 50 on the proxy server 1 by a device manager 49.

The XML database 50 is a data tree stored on the basis of the standardized "Document Object Model". If an HTML page loaded via the HTTP server 40 into the browser of a user facility N1, . . . or NN connected to the proxy server 1 now contains Java code which sets up a parallel UDP connection (UDP—"User Defined Protocol") for the RPC protocol, then this path is used to address an RPC server 51 from the company intranet. Since, for performance reasons, the RPC protocol is based on the standardized UDP/IP protocol, the proxy server 1 needs to include a connection manager 52 in this case, since the UDP protocol does not work on a connection-oriented basis. The connection manager 52 ensures that each user facility N1 . . . NN from the company intranet has reserved for it a dedicated communication port for an RPC client 53 on the proxy server 1 into the device network. The RPC requests from the company intranet are then forwarded directly to the device network using the RPC client 53 on the proxy server 1.

The responses from the field devices FG1 . . . FGN to RPC requests are forwarded to the RPC server 51. This forwards the response from the respective field device FG1, . . . or FGN to the user facilities via the company intranet. In parallel therewith, the dynamic data from the respective field device FG1, . . . or FGN which are currently being transferred in the RPC protocol are stored in the XML database 50 in the proxy server 1.

The data stored in the XML database 50 can be converted into any other data formats using an XSL parser 54 integrated in the proxy server 1. The transformation instructions required for this purpose need to be stored locally in the proxy server 1 as an XSL script file. To trigger such a transformation process, an *.XML file needs to be requested on the HTTP server 40. Such a request is filtered out of the normal access path to the cache manager 43 by the file filter 42 connected to the HTTP server 40 and is forwarded to the XSL parser 54. The letter reads from the files stored locally in the proxy server 1 not only the requested XML file but also an XSL file of the same name, and starts the transformation process. The result of this transformation is sent to the requesting user by the HTTP server 40. In this way, by way of example, HTML files can be produced dynamically from an XSL master containing the current data in the field devices FG1 . . . FGN from the XML database 50, or simply a subtree of the database can be transferred as XML file.

The file filter 42, the cache manager 43, the local files 44, the file cache 45, the XSL parser 54 and the XML database 50 form a file system in the proxy server 1.

Individual function blocks of the proxy server 1 are described in more detail below.

HTTP Server

An explanation will first be given of the basic manner of operation of the HTTP server 40 formed in the proxy server 1 (cf. FIG. 8), with a few fundamental principles of HTTP being described for the purpose of better understanding.

As in the case of other application protocols on the Internet, HTTP (HTTP—"Hypertext Transfer Protocol") is an ASCII protocol, which, for data interchange, requires a secure TCP connection between a client (computer belonging to the Internet user) and a server (server facility on which retrievable Internet contents—data—are available). The starting point defined in this case is the port 80, i.e. an HTTP server listens in on this port for new client connections. Alternatively, the majority of HTTP server software can also be instructed, using an appropriate configuration dialog, to use another port for making contact.

In contrast to other protocols, e.g. FTP (FTP—"File Transfer Protocol") and POP3, a connection between an HTTP client and an HTTP server is very short-lived. The HTTP client sets up a TCP connection to the desired HTTP server via the port 80 and sends a query regarding a desired document to the HTTP server. The HTTP server receives the query, evaluates it and—in the event of success—returns the desired document to the HTTP client. The HTTP server automatically closes the TCP connection after it has sent the HTTP client the requested document or an error message as a response to its query.

One important functionality of HTTP is that the HTTP client can notify the HTTP server of what kind of data it is able to understand. Every query therefore needs to involve a communication between the HTTP client and the HTTP server regarding how the data are to be transferred. This communication gives rise to a "surplus" or overhead. HTTP is therefore also referred to as a stateless protocol, because the connection does not pass through a plurality of phases, from login through data interchange to logout by the HTTP client. On the one hand, this facilitates the development of HTTP client/HTTP server software, but it is not very efficient in terms of the use of the available bandwidth.

The HTTP protocol is used to obtain access to sources in URL format (URL—"Uniform Resource Locator"). The HTTP client, usually a web browser on the Internet user's computer. It requires an HTML page and generates, on the basis thereof, a sequence of queries relating to the file references in this HTML page. The user will then probably click on a link in the requested HTML page, and the HTTP client sends a query, relating to the HTML pages linked by means of this link, to the same or another HTTP server. These further communication connections no longer have any information about a previous connection. This works for simple client/server environments. For more comprehensive communications, this manner of operation may become problematical, however, because this surplus ("overhead") is incurred for any volume of data needing to be transferred, however small, which reduces efficiency.

Figure 9:
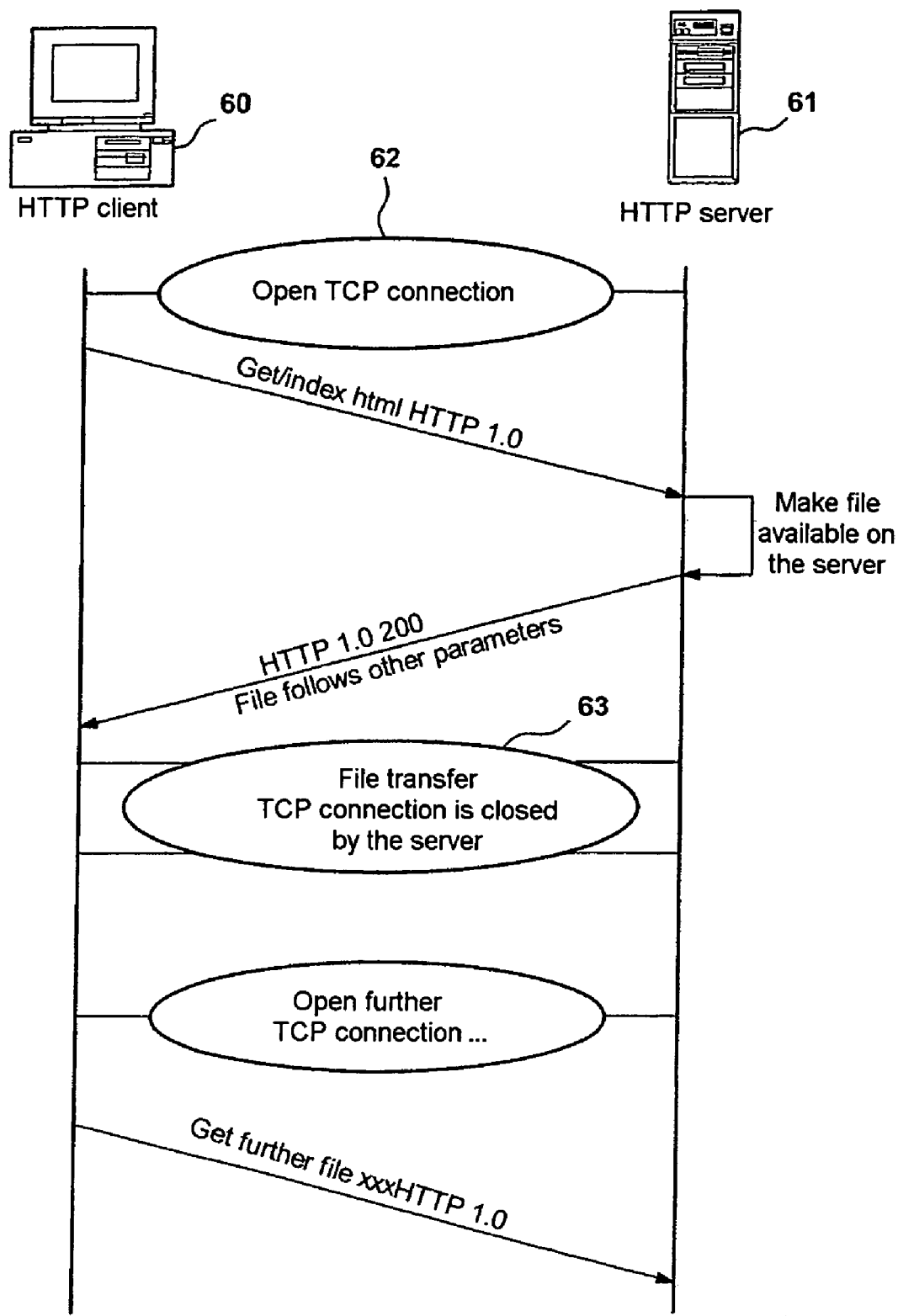
FIG. 9 shows a client/server interaction.

FIG. 9 shows a schematic illustration of the syntax of a query in connection with an HTTP client/server interaction.

The HTTP client/server interaction comprises a single query/response communication. It comprises a "request line", one or more optional "request header fields" and an optional "entity body". From the HTTP client end 60, that is to say generally from the Internet browser, a TCP connection to the HTTP server 61 is opened 62. Next, the HTTP client 60 sends a command string to the HTTP server 61. The HTTP server 61 uses the TCP connection opened by the HTTP client 60 to respond with a header which, besides the HTTP version supported by the HTTP server 61, also contains the MIME type and the coding of the requested file. This header in ASCII format has the content of the requested file appended to it by the HTTP server 61. When the HTTP server 61 has sent the entire file, it closes the TCP connection opened by the HTTP client 60 again 63. This procedure can be repeated as often as desired.

The following compilation shows the flow of a typical HTTP access operation:

1. "connection" (connection setup)
   WWW-client sets up a TCP/IP connection to the WWW server
2. "request"
   Indication of an access method (GET, HEADER, POST . . .
   Specification of the desired document by means of URL
   Additional information in the form of MIME header
   Data (for POST)
3. "response"
   Header with status code
   Additional information in the form of MIME header
   Document in HTML format
   Data in other formats (images, sound . . . )
4. "close" (connection cleardown)
   Normally from the HTTP server, following data transfer In special cases on the HTTP client (transfer time, storage space)

In this context, the "request line" comprises three text fields separated by spaces. The first field specifies the method (or the command). The second field specifies the name of the source (is the URL without indication of the protocol and of the host). The last field specifies the protocol version used by the HTTP client 60, for Example HTTP/1.0. The "request header fields" give additional information about the query and the HTTP client 60. The fields are used as a kind of RPC parameter. Each field comprises a name, followed by a colon and the field value. The order of the "header fields" is not important in this context. The "entity body" is sometimes used by HTTP clients 60 in order to send larger information packets to the HTTP server 61.

File Cache

To allow the cache manager 43 to work as efficiently as possible, the file cache 45 does not work, as is customary, with the URL, date and the service life of the files which are to be managed, but rather uses further criteria to identify a file. If just the three stated criteria were used for the decision regarding whether a file available locally in the file cache is identical to the file available in the field device, then it would be necessary to compare the stated file features in order to carry out this test. This would require the header for each file to be requested from the field device. However, since the file system in the field devices FG1 . . . FGN is loaded as a unit in the form of KON files (converted files—format of the files which can be loaded into the user facilities N1 . . . NN), such a comparison is not required for every file. One exception in this case is the files produced dynamically in the field devices FG1 . . . FGN, for example the file MLFB.TXT (MLFB—machine-readable factory designation), which is read from the file system in the field devices FG1 . . . FGN, but rather is generated from the MLFB which is set in the respective field device FG1, . . . or FGN.

Serving as a distinguishing feature between these two file forms, namely the static files and the files including dynamic data, is an entry in a file "nocache.txt". All the files generated dynamically in the field devices FG1 . . . FGN need to appear in this file.

Static files are characterized by an infinite service life by the HTTP server HS1 . . . HSN in the field devices FG1 . . . FGN. An example of the content of the file "nocache.txt" is shown below:

/mlfb.txt: MLFB, BF No., displaytype
/textpool.zip: device-specific texts for applets (multilingual)
/ver.txt: version, date
/chartab.jar: device character set In this context, the file "ver.txt" can have/indicate the following content:
V01.01.01
Tue, Oct. 24, 2000 07:50:00 GMT Slot Protocol for the Proxy Server Slot protocol 48 (cf. FIG. 8) is used to link the proxy server 1 to the field devices FG1 . . . FGN in an arrangement with a star coupler as shown in FIG. 7. The slot protocol 48 is divided into the two areas of (i) device identification and (ii) arbitration of the star coupler arrangement. The device identification is used for automatically identifying the field devices FG1 . . . FGN connected to the star coupler 39. The arbitration needs to prevent collisions between datagrams from different field devices FG1 . . . FGN on the communication connection between the proxy server 1 and the individual field devices FG1 . . . FGN.

The device identification when the star coupler arrangement 39 is used is described below.

Device Identification

Device identification is a part of the slot protocol 48. This protocol part occupies the serial connection exclusively, i.e. no other communication may be active on the modem link during device identification. For this reason, the device identification is activated only when the modem connection is set up. In the course of operation of the observation and operating system, this protocol part is inactive. The device identification can be activated when required, however.

Figure 10:
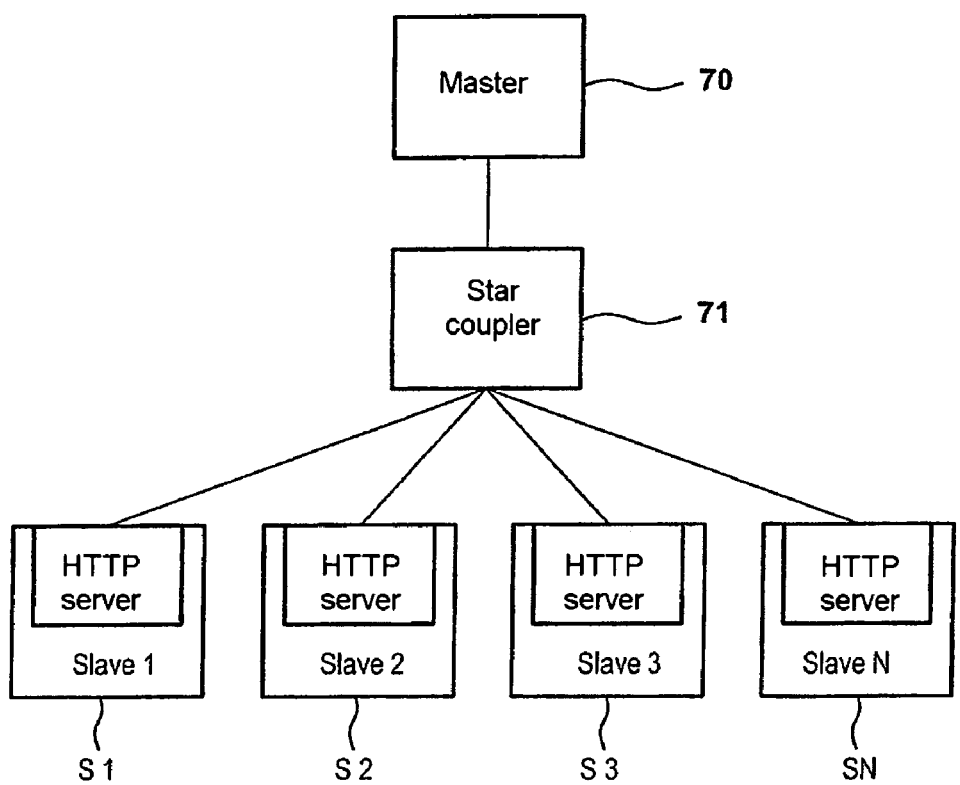
FIG. 10 shows a device identification in a master/slave arrangement.

FIG. 10 shows a master-slave arrangement with a star coupler to explain the device identification.

The slot protocol 48 works on the basis of the master-slave principle. A master 70 is on the top access point in FIG. 10. The bottom access points associated with a star coupler 71, which corresponds to the star coupler 3 in FIG. 1, are occupied by one respective slave S1 . . . SN, which correspond to the field devices FG1 . . . FGN shown in FIG. 1. The master 70 could poll for any possible address of the connected slaves S1 . . . SN and, in the event of a response to this query, could incorporate the slave S1, . . . or SN found into the list of the devices which are known to the master 70. This procedure can no longer be performed with an address range of 32 bits, however. In this case, 2^32 polling operations would be necessary. This number is no longer implementable, however, since in this case the time required for this polling operation would exceed the service life of the plant. To be able to identify the devices connected to the master 70 automatically nevertheless, the invention solves the problem in the following manner:

In the case of an addressing scheme with a binary-coded address having a permanently prescribed address length, a query involves polling for an address range. The slaves which are present in the polled address range respond to this query. Since a plurality of field devices (slaves) may be present in the same polled address range in this instance, a simultaneous response from a plurality of the slaves S1 . . . SN inevitably results in a collision in this case. This collision is consciously accepted and is part of the proposed method. For this reason, the master 70 checks only whether any response to its query has actually been received within a defined period of time.

Figure 12:
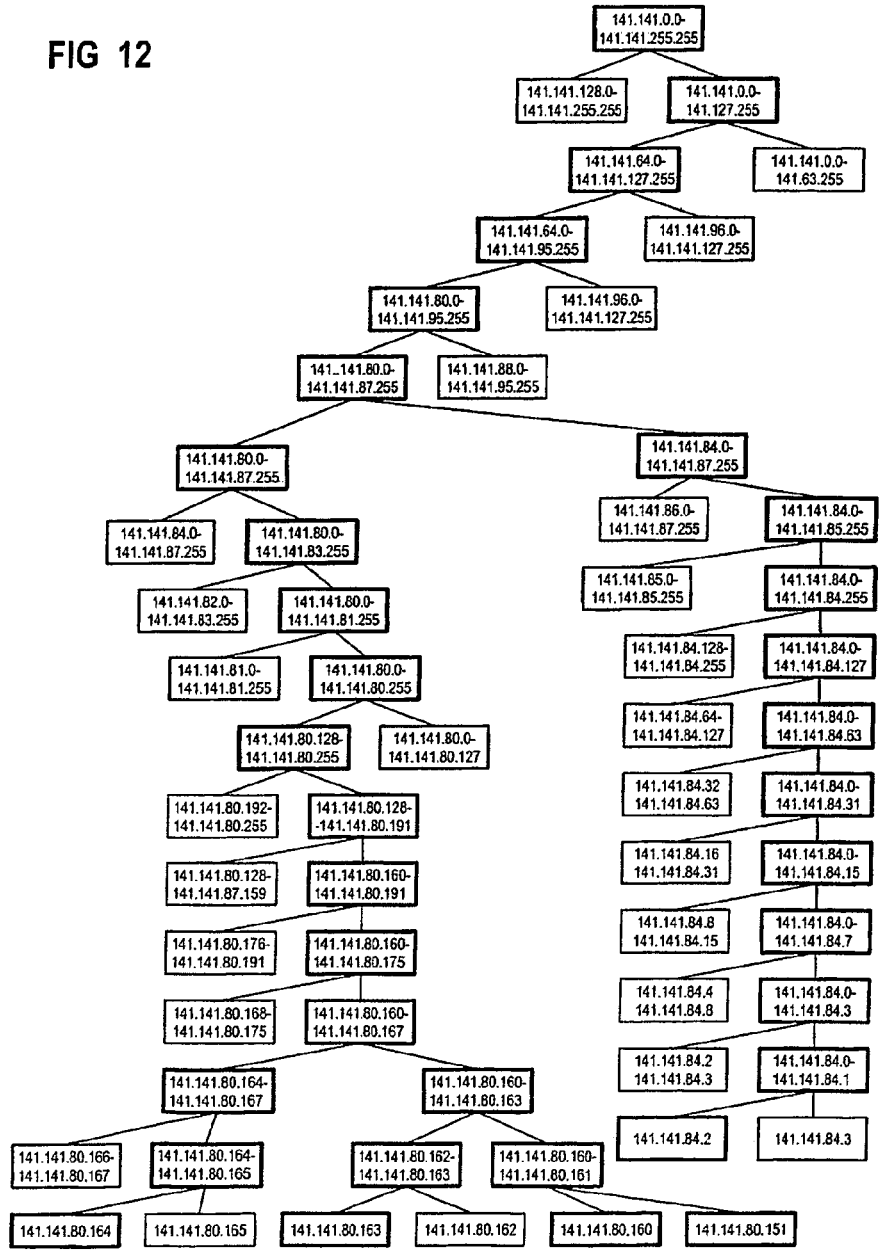
FIG. 12 shows a schematic tree representation of a method for device identification.

If the address space of the addressable slave S1 . . . SN is n bits, the master 70 sends a respective query with one definite bit of the address and a mask for the other address bits. Two polling operations can be used to test whether there are slaves in the address range prescribed by the definite bit. If a response to a query has been received for an address range, then the mask is reduced by one bit, and the next definite bit is tested using another two polling operations to determine whether there are slaves in the now smaller address range. If the query for the now smaller address range receives a response, then the next bit of the address range including slaves has been found. This procedure is repeated until the mask for the address range has been reduced to 0 bits. One of the slaves S1 . . . SN on the bus has then been clearly identified. If a polling operation for both states of the currently tested bit receives responses, then both branches are pursued further in the next iteration. Since, with a mask size of 0 bits, the device or the slave with the queried, now entirely definite address can respond to the query sent, it is also no longer possible for collisions to occur for the last query, and the response message from the slaves which are to be detected can contain spontaneous information about the state of the connected slaves. FIG. 12 explains the described method once again with reference to a simple addressing scheme with a 4-bit address, that is to say for an address space of 0 to 15. It is assumed that the devices with the address 3, 4 and 7 are present in the arrangement. The starting point is polling for the most significant bit.

That is to say, first the address space 0 to 7 and, in a second polling operation, the address space 8 to 15 are tested using a polling operation. This second polling operation does not receive a response from any device. For the first polling operation, the master receives one or more responses. For this reason, the mask is reduced by a further bit in the address space 0 to 7. That is to say, now the address range 0 to 3 is checked using a third polling address, and the address range 4 to 7 is checked using a fourth polling operation. This procedure is repeated in line with the illustration in FIG. 12 until the addresses have been resolved completely and hence all the devices have been found.

In the example described, the slaves S1 ... Sn or the field devices FG1 ... FGN are connected to the master 70 using an IP-based protocol. In the IP protocol, the bus users have a 32-bit address. The address is split into octets, and each octet is represented in decimal form. The hexadecimal 32-bit number 0x8D8D8000 thus corresponds to the IP address 141.141.128.0. For the actual device identification/polling operation, a recursive variant of the method described in the preceding paragraph is used.

Figure 11:
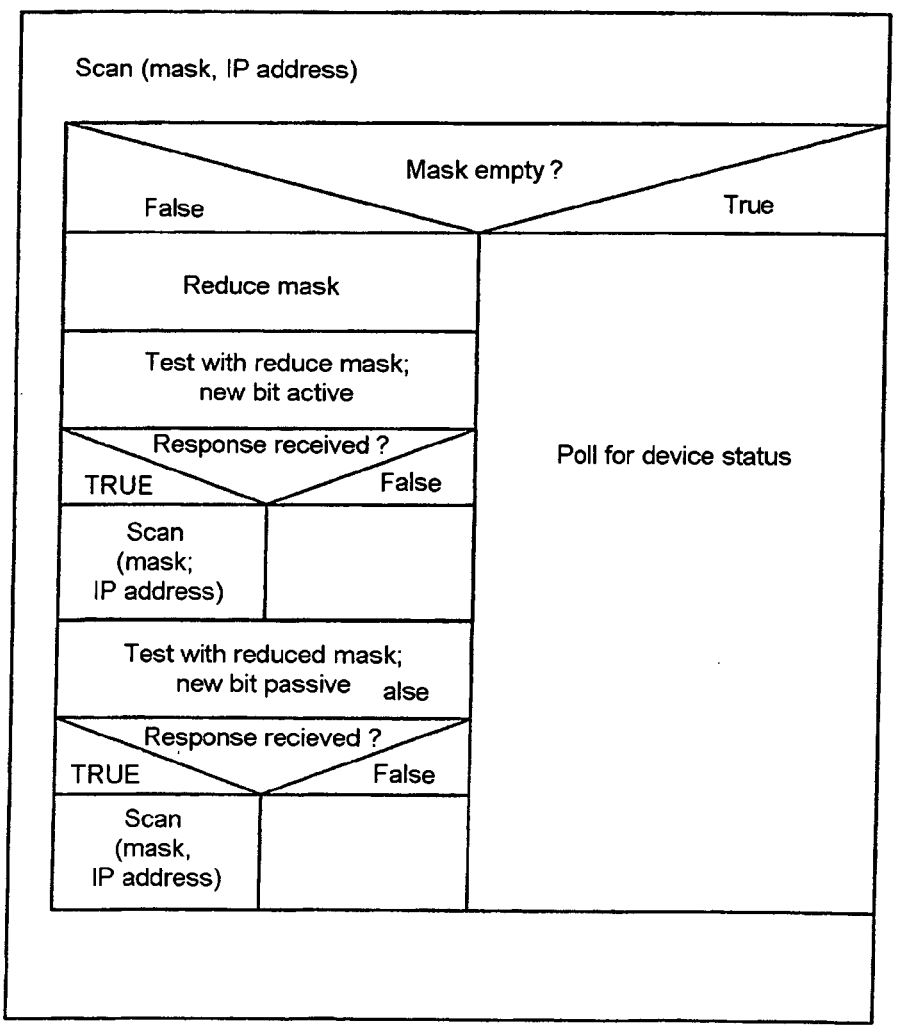
FIG. 11 shows a Nassi-Sneider diagram.

FIG. 11 shows the flowchart for the method in the form of a Nassi-Sneidermann diagram.

The method described involves the test for whether a field device (slave) can be addressed in the available address range being triggered by the master 70, preferably using a request datagram, which is known as such. In contrast to conventional methods, however, it is consciously accepted that a plurality of the slaves S1 ... SN respond simultaneously to a request datagram sent by the master 70. The fact that the signals received from the slaves S1 ... SN are logically combined in the star coupler 71 using a logic OR gate and that this aggregate signal is forwarded to the master 70 makes it possible to ensure that a response from one of the slaves S1 ... SN is identified in the master 70 in all cases. If the response datagrams from a plurality of the slaves S1 ... SN overlap in time, an erroneous datagram is received in the master 70. This case is also identified as a response.

Using the stipulation of a maximum response time for the slaves S1 ... SN to a request datagram from the master 70 and of the datagram transfer time, it is possible to define a monitoring time for the master 70. If the master 70 receives a response within this monitoring time, then there are slaves or field devices in the queried address range. Conversely, the queried address range contains no field devices if the master 70 has not received a response to the request within the monitoring time.

Since one of the slaves S1 ... SN may respond in the case of full resolution of the address in the request from the master 70 (i.e. the mask becomes empty), it is also no longer possible for any collision to occur in this case. This means that, in this case, the error protection of the received datagram can be used to exclude a line fault and hence any possible error identification for a connected slave. If, during the monitoring time, a request from the master is followed by the appearance of a line fault which is simulated by a slave which is not present, this results merely in extension of the polling procedure, but not in incorrect identification of connected slaves, since this line fault is identified no later than upon the full resolution of the mask.

The following paragraph uses an example to show the operation of the method:

| | |
|---|---|
| Test: 141.141.128.0 | Mask: 255.255.128.0 |
| Test: 141.141.0.0 | Mask: 255.255.128.0 |
| Test: 141.141.64.0 | Mask: 255.255.192.0 |
| Test: 141.141.96.0 | Mask: 255.255.224.0 |
| Test: 141.141.64.0 | Mask: 255.255.224.0 |
| Test: 141.141.80.0 | Mask: 255.255.240.0 |
| Test: 141.141.88.0 | Mask: 255.255.248.0 |
| Test: 141.141.80.0 | Mask: 255.255.248.0 |
| Test: 141.141.84.0 | Mask: 255.255.252.0 |
| Test: 141.141.86.0 | Mask: 255.255.254.0 |
| Test: 141.141.84.0 | Mask: 255.255.254.0 |
| Test: 141.141.85.0 | Mask: 255.255.255.0 |
| Test: 141.141.84.0 | Mask: 255.255.255.0 |
| Test: 141.141.84.128 | Mask: 255.255.255.128 |
| Test: 141.141.84.0 | Mask: 255.255.255.128 |
| Test: 141.141.84.64 | Mask: 255.255.255.192 |
| Test: 141.141.84.0 | Mask: 255.255.255.192 |
| Test: 141.141.84.32 | Mask: 255.255.255.224 |
| Test: 141.141.84.0 | Mask: 255.255.255.224 |
| Test: 141.141.84.16 | Mask: 255.255.255.240 |
| Test: 141.141.84.0 | Mask: 255.255.255.240 |
| Test: 141.141.84.8 | Mask: 255.255.255.248 |
| Test: 141.141.84.0 | Mask: 255.255.255.248 |
| Test: 141.141.84.4 | Mask: 255.255.255.252 |
| Test: 141.141.84.0 | Mask: 255.255.255.252 |
| Test: 141.141.84.2 | Mask: 255.255.255.254 |
| Test: 141.141.84.3 | Mask: 255.255.255.255 |
| Test: 141.141.84.2 | Mask: 255.255.255.255 |
| Found: 141.141.84.2 | |
| Test: 141.141.84.0 | Mask: 255.255.255.254 |
| Test: 141.141.80.0 | Mask: 255.255.252.0 |
| Test: 141.141.82.0 | Mask: 255.255.254.0 |
| Test: 141.141.80.0 | Mask: 255.255.254.0 |
| Test: 141.141.81.0 | Mask: 255.255.255.0 |
| Test: 141.141.80.0 | Mask: 255.255.255.0 |
| Test: 141.141.80.128 | Mask: 255.255.255.128 |
| Test: 141.141.80.192 | Mask: 255.255.255.192 |
| Test: 141.141.80.128 | Mask: 255.255.255.192 |
| Test: 141.141.80.160 | Mask: 255.255.255.224 |
| Test: 141.141.80.176 | Mask: 255.255.255.240 |
| Test: 141.141.80.160 | Mask: 255.255.255.240 |
| Test: 141.141.80.168 | Mask: 255.255.255.248 |
| Test: 141.141.80.160 | Mask: 255.255.255.248 |
| Test: 141.141.80.164 | Mask: 255.255.255.252 |
| Test: 141.141.80.166 | Mask: 255.255.255.254 |
| Test: 141.141.80.164 | Mask: 255.255.255.254 |
| Test: 141.141.80.165 | Mask: 255.255.255.255 |
| Test: 141.141.80.164 | Mask: 255.255.255.255 |
| Found: 141.141.80.164 | |
| Test: 141.141.80.160 | Mask: 255.255.255.252 |
| Test: 141.141.80.162 | Mask: 255.255.255.254 |
| Test: 141.141.80.163 | Mask: 255.255.255.255 |
| Found: 141.141.80.163 | |
| Test: 141.141.80.162 | Mask: 255.255.255.255 |
| Test: 141.141.80.160 | Mask: 255.255.255.254 |
| Test: 141.141.80.161 | Mask: 255.255.255.255 |
| Found: 141.141.80.161 | |
| Test: 141.141.80.160 | Mask:255.255.255.255 |
| Found: 141.141.80.160 | |
| Test: 141.141.80.128 | Mask: 255.255.255.224 |
| Test: 141.141.80.0 | Mask: 255.255.255.128 |
| Test: 141.141.64.0 | Mask: 255.255.255.0 |
| Test: 141.141.0.0 | Mask: 255.255.255.0 |
| 58 Polling operations ... | |

The polling operations included the address space 141.141.0.0 to 141.141.255.255. The devices having the following addresses were found:

141.141.84.2
141.141.80.164
141.141.80.163
141.141.80.161
141.141.80.160

FIG. 12 illustrates the represented procedure in the form of a tree representation, where the fields with a bold border characterize the polling operations which have received responses from one or more slaves S1 . . . SN or field devices.

Broadcast Service

For linking the proxy server 1 to the field devices FG1 . . . FGN, it is possible to use an IP based network instead of the simple architecture with a star coupler 39. In this case, arbitration of this network by a protocol, for example the slot protocol 48, is not necessary. This function is undertaken by the network itself. In this embodiment, it is likewise possible to use functions of the network for the device identification. In the case of a network connection between the proxy server 1 and the field devices FG1 . . . FGN, a broadcast service is used for autoconfiguration of the observation and operating system.

In both cases of the identification of the connected field devices FG1 . . . FGN, i.e. in the case of the embodiment with a star coupler arrangement and when a network is used, particularly a LAN, the identification is carried out automatically when the observation and operating system is started up, and it takes place without prior parameterization of the components involved in the system.

The broadcast service is used to identify the field devices connected to the IP-based network (e.g. LAN), which include a server for their dedicated operation. In addition, the broadcast service is used to collect spontaneous events which have occurred in the connected field devices. The broadcast service is an IP application and is thus based on the functions of the IP stack and is supported by the UDP protocol. For this service, by way of example, a permanently prescribed port 0xD000 is reserved at the server end. At the client end, a free port is selected dynamically. The use of the standard UDP/IP protocol makes it possible, in this case, to obtain support from the IP programming interfaces of ordinary operating systems, such as MS Windows or Linux. This means that the proxy server 1 can be proposed for conventional office servers without difficulty.

The broadcast service is active both in the proxy server 1 and in the individual field devices. For the broadcast service, the proxy server 1 is stipulated as the master. A configuration polling operation is a UDP message sent by the master. This message is sent, depending on configuration, to a broadcast or multicast IP address. A description of broadcast or multicast IP addresses can be found, by way of example, in Karanjit S. Siyan: Inside TCP/IP Third Edition, New Riders Publishing, Indianapolis, 1997, ISBN 1-56205-714-6, pages 187ff.

All field devices will then respond to the master's configuration polling operation with a UDP message including the most important configuration data for the field device. Since, theoretically, all field devices connected to the IP-based network now wish to respond at the same time, there will at first be a few collisions on the bus used, these collisions being resolved by the CSMA/CD method (CSMA—"carrier sense, multiple access/collision detect"). A description of this method can likewise be found in Karanjit S. Siyan: Inside TCP/IP Third Edition, New Riders Publishing, Indianapolis, 1997, ISBN 1-56205-714-6, pages 97ff. The UDP response messages from all active field devices will thus arrive with the polling master within a certain time. The polling party is thus able to establish how many and what field devices there are in the network, and can subsequently request further information about the HTTP protocol or other IP-based protocols from the field devices.

The broadcast service also has the task of distributing an event spontaneously accumulating in one of the field devices in the IP-based network to the users of the broadcast service. Since, firstly, the field devices have no information about which master is responsible for this signal, and secondly it may be possible for a plurality of masters with distributed tasks to exist in the IP-based network, the event message is sent to the network users as a broadcast. Depending on the event type and the sender, the masters can ignore this signal or can trigger an action which uses a further protocol, e.g. HTTP, to retrieve additional information from the field device. This retrieval by the appropriate master of additional information from the field device sending the event serves simultaneously as acknowledgment of receipt by the master. If an event message is not acknowledged, then it is repeated at regular intervals (for example approximately 10 s or at a logarithmetically increasing time) until an acknowledgment is received from a master.

Figure 13:
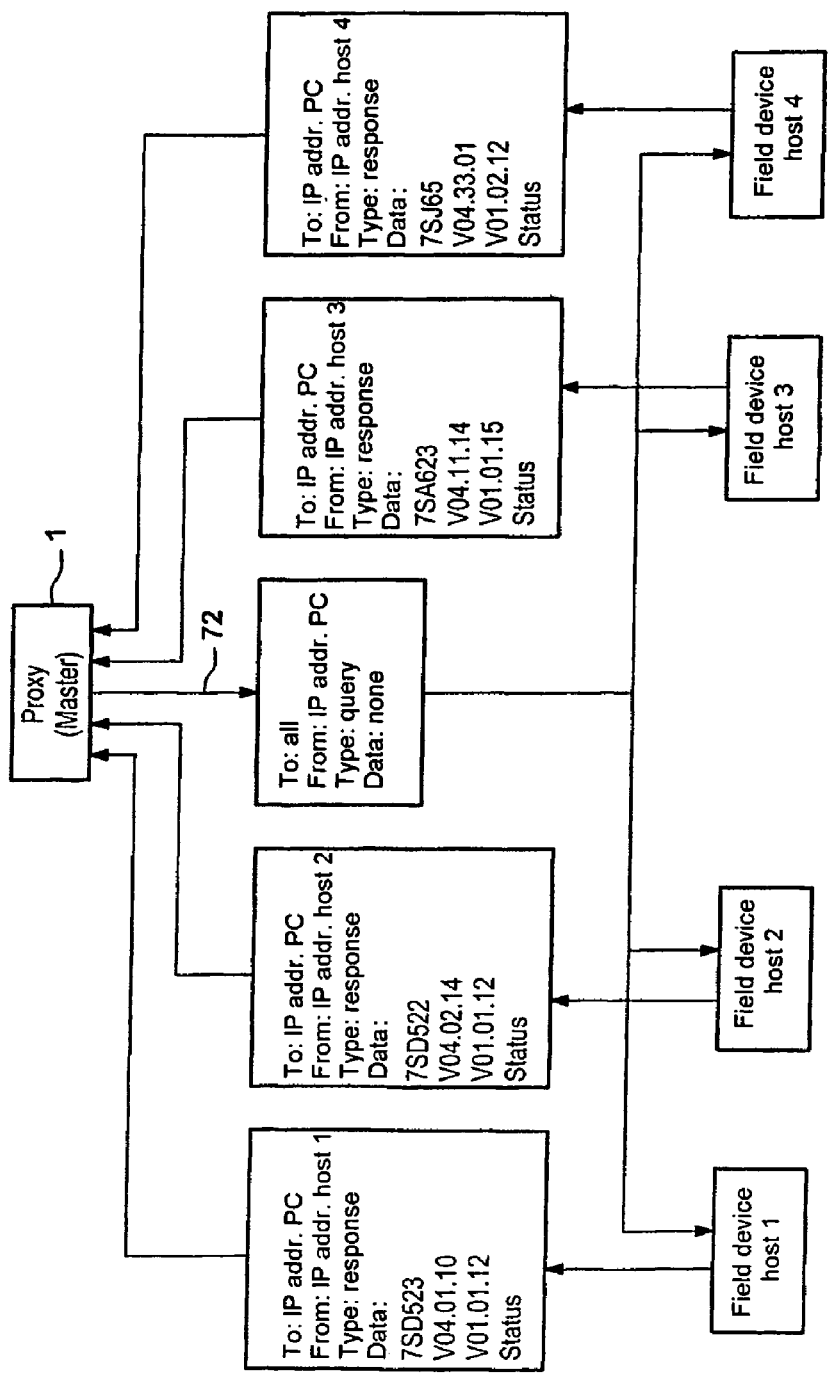
FIG. 13 shows a master/slave arrangement to explain a configuration polling operation.

FIG. 13 shows a schematic illustration to explain the method within the context of the configuration polling operation.

The proxy server 1 sends, as master, a configuration query 72 as a broadcast to the users in the network. The field devices FG1 . . . FGN respond with a UDP datagram to the IP address of the master which sent the configuration query.

This UDP datagram contains the most important information about the connected devices, as already illustrated.

Device Management

Figure 14:
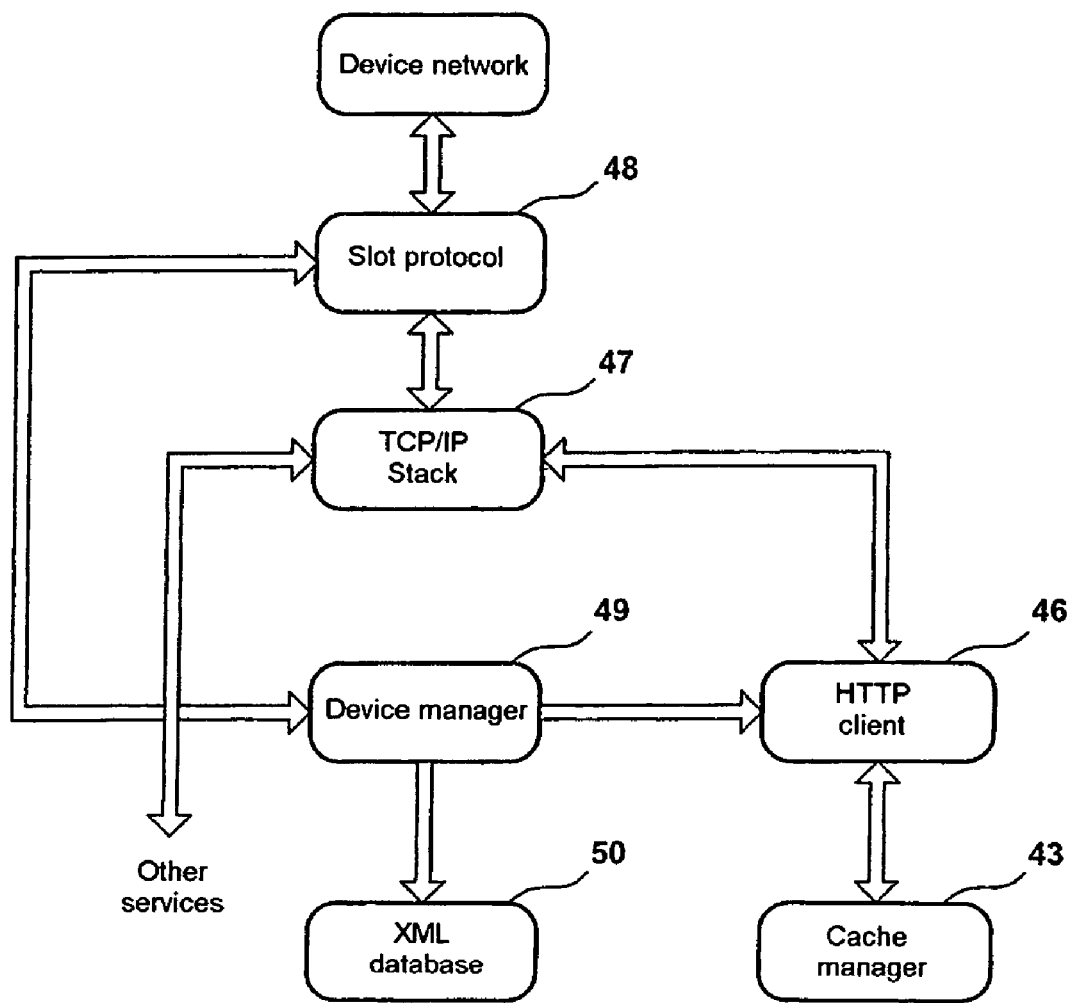
FIG. 14 shows a block diagram of device management in the proxy server.

The field devices or slaves identified with the aid of the device identification when the star coupler 39 or the broadcast service is used are managed in the proxy server 1 using the device manager 49 (cf. FIG. 8). FIG. 14 shows a schematic block diagram of the connection of the device manager 49 in the proxy server 1.

The device manager 49 provides the cache manager 43 and the XML database 50 with information about the field devices FG1 . . . FGN identified in the device network. To this end, the device manager 49 obtains its information about the connected field devices FG1 . . . FGN from the method taking place within the context of the slot protocol 48. This provides the IP addresses of the connected field devices FG1 . . . FGN. The device manager 49 is provided with the information about the identified field devices FG1 . . . FGN by the slot protocol 48. The slot protocol 48 supplies the device manager 49 with the IP addresses of the identified field devices FG1 . . . FGN. The other information about the field devices FG1 . . . FGN, which needs to be provided by the device manager 49 in the proxy server 1, is obtained when HTTP data are downloaded in stipulated files from the field devices FG1 . . . FGN. The device manager 49 uses the known IP addresses of the identified field devices FG1 . . . FGN to provide the cache manager 43 with the following information about the field devices FG1 . . . FGN: field device type, field device version and version of the file block for the observation and operating system.

The file cache 45 (cf. FIG. 8) likewise includes this information for the files already stored therein. This means that, when a file is requested from a particular one of the field devices FG1 . . . FGN, this information can be used to decide whether the file held in the file cache 45 is identical to the file which is available in the field device, without reading the file header of the requested file from the particular field device. The file's version information held in the file cache 45 is compared with the information from the device manager 49 for the IP address of the particular field device.

The connection of the device manager 49 to the XML database 50 serves to provide information from the field devices FG1 . . . FGN. This information is loaded from the field devices FG1 . . . FGN in the form of an XML file. The following table shows an overview of the contents of this file:

| Information | Tag | Description |
| --- | --- | --- |
| Device type | DEV_TYPE | Characters 1..6 in the MLFB |
| MLFB | MLFB | Full MLFB of the device |
| BE-Number | BE_NR | Device identifier ("unique number") |
| Version | VER_KEYS | List of version keys |
| File System | VERSION | Date and version number of the file system |
| Firmware | VERSION | Date and version number of the device firmware |
| System firmware | VERSION | Date and version number of the system firmware used in the device |
| "Noncacheable" files | NOCACHE | List of all the files which always need to be fetched directly from the device |
| Menu tree | MENU | Device control tree for embedding into the proxy server control tree |
| Process data | DATA_OBJ | List of XML files which describe all the process data which can be delivered by the device |

This information is stored in a file "DevData.xml". The device manager 49 prompts an HTTP download for this file when one of the field devices FG1 . . . FGN has been found by the slot protocol 48. Further files are loaded from the field device by the device manager 49 if their file path is included in this XML file, i.e. all files encapsulated with a <DEV_PATH>-tag are loaded.

Following download, the file "DevData.xml" is transformed in the proxy server 1, using the XSL parser 54, into the internal format of the proxy server 1 and is then entered in the XML database 50 of the proxy server 1.

XSL Parser

The XSL parser 54 (cf. FIG. 8) is used to produce dynamically generated HTML files from the central XML database 50 of the proxy server 1. This is done using XSL scripts which are stored locally in the proxy server 1. The XSL scripts can be installed on the proxy server 1 using an admin page.

Figure 15:
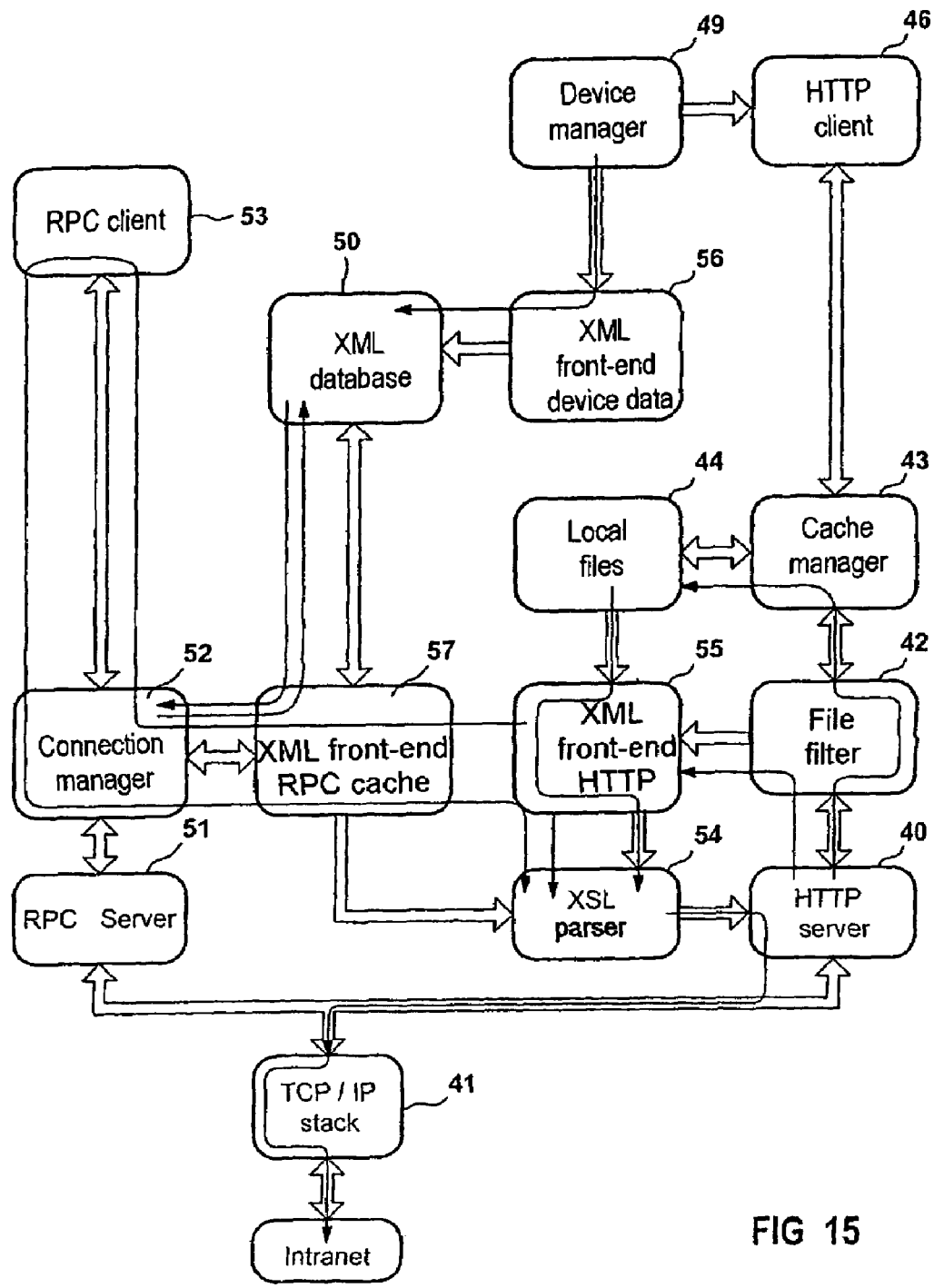
FIG. 15 shows a block diagram to explain the functional incorporation of an XSL parser in the proxy server (XSL—"EXtended Stylesheet Language").

FIG. 15 shows the connection of the XSL parser 54 in the proxy server 1.

If the HTTP server 40 is used by the user facilities N1 . . . NN to request an XML file from the intranet, then this request is filtered out by the file filter 42 and is forwarded to the XML front-end HTTP 55. This front-end searches for an XSL transformation script belonging to the request XML file and starts the XSL parser 54 with these two files.

Since dynamically generated HTML pages always use the data which are used from the XML database 50 which is present locally on the proxy server 1, the content of this database needs to be aligned with the data held in the devices. This alignment process is necessary because a large amount of the data stored in the XML database 50, such as measurements, are variable over time. This alignment is undertaken by the XML front-end RPC cache block 57. When the XSL parser 54 accesses the XML database 50, the interposed XML front-end 57 checks the validity period of the requested information. If the requested information has already become invalid, then it is re-requested by the connection manager 52 from the RPC client 53 from the device, is updated in the XML database 50 and is forwarded to the XSL parser 54.

The device manager 49 continually monitors the status of the devices connected to the device network and updates this information using the XML front-end device data 56 in the XML database 50.

The XSL parser 54 is the principal link for representing the current data, received from the field devices FG1 . . . FGN, from the XML database 50. Each XSL script prescribes transformation rules which stipulate how particular data from the XML database 50 are to be displayed in the form of HTML pages in the user facilities N1 . . . NN. One of the basic principles of XML is the separation of content and presentation. An XML document includes "content", and its presentation needs to be defined separately, in the form of a stylesheet. There are various options for adding the representation information to an XML document. These are based on two fundamental methods: either the document is put into a representable form in line with a stylesheet or the stylesheet instructs the representation mechanism in how the individual elements of the document need to be represented. These two fundamental methods can be varied in different ways:

CSS stylesheet+XML document→XML-compatible browser

The browser processes the document and the representation information in the form of a CSS stylesheet and reproduces a presentation.

XSL stylesheet+XML document→XSL-compatible representation program

A representation program which can process XSL stylesheets receives, besides the document, the presentation information in the form of an XSL stylesheet.

XSL stylesheet+XML document→XSL transformer→HTML document

The XML document is transformed, in line with the transformation rules of an XSL stylesheet, by an XSL transformer into an (X)HTML document which can then be represented by a browser.

Figure 16:
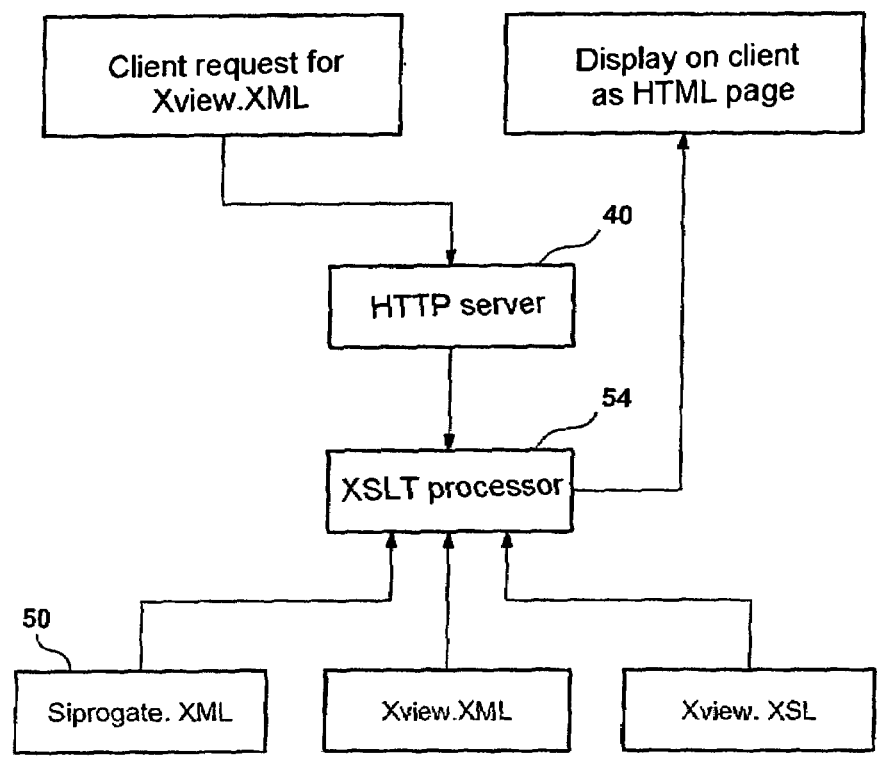
FIG. 16 shows a block diagram to explain an XSLT processor (XSLT—"EXtended Stylesheet Language Transformations").

FIG. 16 shows a schematic block diagram of an XSLT processor (XSL—"Extended Stylesheet Language Transformation").

The block diagram shown in FIG. 16 clarifies once again the flow of data when an XML file is requested. The file Xview.XML requested by the client is forwarded to the XSLT processor 54 by the HTTP server. The XSLT processor searches for the file Xview.XSL belonging to the requested file Xview.XSL and starts the XSLT processor 54 with these two files. If the transformation process started using the requested file Xview.XML needs to use process data from the XML database 50 in the proxy server, then the transformation script Xview.XSL needs to contain a reference of this database. In the example shown in FIG. 16, this XML database 50 has the name Spirogate.XML.

Since all the information displayed using the user facilities N1 . . . NN passes through an XSLT processor when it is requested, it is expedient to check the information requested in this process, as already described, for its validity using the XML front-end RPC cache 57 and to use the result for an update mechanism. This requires the XSLT parser to be manipulated such that it is possible to establish which data from the individual databases are involved in the design of the HTML page which is to be produced. This information is then used, in a second step, to establish whether these data are current. This is followed by initiation of the update mechanisms required for this purpose, provided that this is necessary, and then the parser procedure is started again, with data which are currently displayed to a user in any form using one or more of the user facilities N1 . . . NN ever being updated. This is achieved by virtue of only the requested data being updated in the XML database. The possibly considerable overall size of the XML database 50 results, with the aid of this mechanism, in a reduction of the data transferred between the field devices FG1 . . . FGN and the proxy server 1, since firstly data are fetched on request, and secondly the data required for the respective representation are ever fetched.

What is claimed is:

1. A method for operating and/or monitoring a field device using a user facility, in which a proxy server facility is used, the proxy server facility being connected to the field device which includes a server facility and to the user facility to interchange electronic data using the user facility to operate and/or observe the field devices, wherein the electronic data to be interchanged for operating and/or monitoring the field device comprise static data, which are transferred between the server facility of the field device and the user facility via the proxy server facility based on a first protocol standard, and dynamic data, which are transferred between the server facility of the field device and the user facility via the proxy server facility based on a second protocol standard.

2. The method as claimed in claim 1, wherein the first protocol standard is the HTTP protocol.

3. The method as claimed in claim 2, wherein the second protocol standard is used to use a connectionless protocol.

4. The method as claimed in claim 1, wherein the static data are transferred from the field device to the proxy server facility and are stored in a memory device in the proxy server facility when the static data are first called by the user facility, the static data thereby becoming available in the proxy server facility for retrieval by the user facility.

5. The method as claimed in claim 1, wherein the dynamic data are transferred from the field device to the proxy server facility and from the proxy server facility to the user facility whenever the dynamic data are called by the user facility.

6. The method as claimed in claim 1, wherein the dynamic and/or the static data are transferred from a server facility in the field device to the proxy server facility.

7. The method as claimed in claim 1, wherein the proxy server facility is configured using a browser facility which is installed on the user facility.

8. The method as claimed in claim 1, wherein operating/monitoring of the field device is in a power plant.

9. A proxy server apparatus, comprising:
a first interface device to produce a first data connection to a server facility of a field device;
a second interface device to produce a second data connection to a user facility, so that the user facility is configured for use and to interchange electronic data to monitor and/or operate the field device; and
a protocol processing device configured so that the server facility of the field device and the user facility are configured to interchange static, electronic data, which are transferred via the proxy server apparatus based on a first protocol standard, and dynamic, electronic data, which are transferred via the proxy server apparatus based on a second protocol standard.

10. The apparatus as claimed in claim 9, further comprising a memory facility for storing the static, electronic data.

11. The apparatus as claimed in claim 9, further comprising a parser facility for automatically converting electronic data into various formats.

12. The proxy server apparatus of claim 9, wherein operating/monitoring of the field device is in a power plant.

* * * * *